(12) United States Patent
Ausin et al.

(10) Patent No.: US 10,157,213 B1
(45) Date of Patent: Dec. 18, 2018

(54) DATA PROCESSING WITH STREAMING DATA

(71) Applicant: SAS Institute Inc., Cary, NC (US)

(72) Inventors: Markel Sanz Ausin, Raleigh, NC (US); Shunping Huang, Cary, NC (US); Gerald Donald Baulier, Apex, NC (US)

(73) Assignee: SAS INSTITUTE INC., Cary, NC (US)

( * ) Notice: Subject to any disclaimer, the term of this patent is extended or adjusted under 35 U.S.C. 154(b) by 0 days.

(21) Appl. No.: 15/813,989

(22) Filed: Nov. 15, 2017

Related U.S. Application Data

(60) Provisional application No. 62/537,449, filed on Jul. 26, 2017, provisional application No. 62/544,874, filed on Aug. 13, 2017.

(51) Int. Cl.
| | |
|---|---|
| *G06F 17/30* | (2006.01) |
| *G06F 17/18* | (2006.01) |
| *H04W 4/38* | (2018.01) |
| *H04L 29/06* | (2006.01) |

(52) U.S. Cl.
CPC ........ *G06F 17/30572* (2013.01); *G06F 17/18* (2013.01); *H04W 4/38* (2018.02); *H04L 65/00* (2013.01)

(58) Field of Classification Search
CPC ................................................ G06F 17/30572
USPC ........................................................ 707/722
See application file for complete search history.

(56) References Cited

U.S. PATENT DOCUMENTS

| | | |
|---|---|---|
| 8,543,517 B2 | 9/2013 | Shotton et al. |
| 9,269,054 B1 | 2/2016 | Martin et al. |
| 2016/0358095 A1 * | 12/2016 | Dong ................ G06F 17/30371 |

OTHER PUBLICATIONS

Ben-Haim et al., A Streaming Parallel Decision Tree Algorithm, Journal of Machine Learning Research 11, Feb. 2010, pp. 849-872.
What is Cassandra?, Available Jul. 27, 2017.
Clojure, Available Jul. 26, 2017.
Sebastião et al., Constructing fading histograms from data streams, Prog Artif Intell 3, Apr. 11, 2014, pp. 15-28.
Sebastião et al., Fading histograms in detecting distribution and concept changes, Int J Data Sci Anal 3, Feb. 23, 2017, pp. 183-212.
Hive Tutorial, Available Jul. 27, 2017.
The Go Programming Language, Available Jul. 27, 2017.

* cited by examiner

*Primary Examiner* — Kimberly L Wilson
(74) *Attorney, Agent, or Firm* — Bell & Manning, LLC

(57) ABSTRACT

A data streaming environment provides a summary of streaming data. An input interface receives streaming data from a sensor or an input device. The input device includes a user interface. The sensor is an Internet of Things (IOT) device. A processor is communicatively coupled to the input interface for processing the streaming data. A histogram update application is executed with the received data to provide a limited-size summary of the streaming data by fading outdated data by storing distance data and bin data. The processed data includes a plurality of records and variables that describe a characteristic of a physical object. An output interface is communicatively coupled to the processor to provide the processed data to be visually presented in one or more data graphs on a display device.

30 Claims, 21 Drawing Sheets

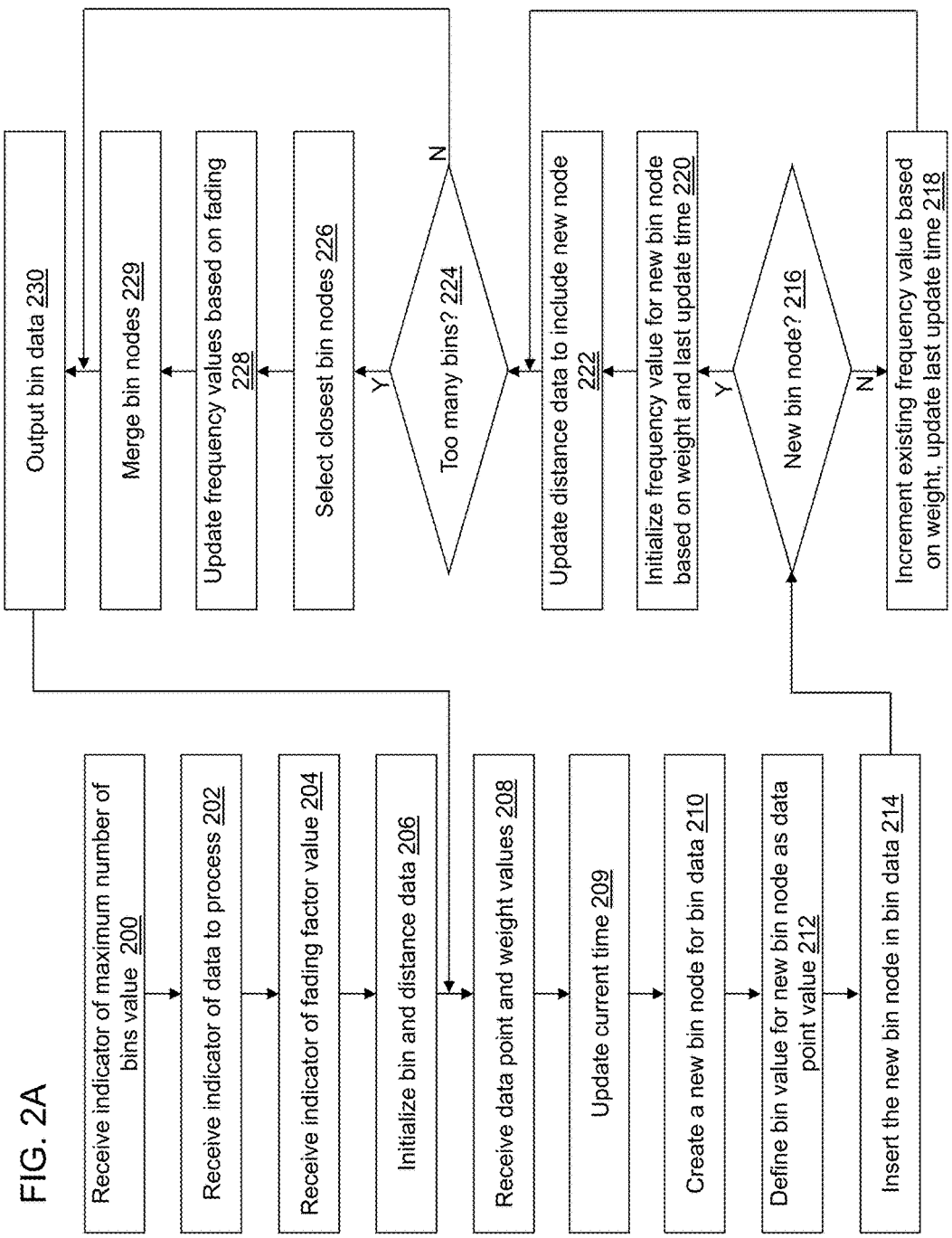

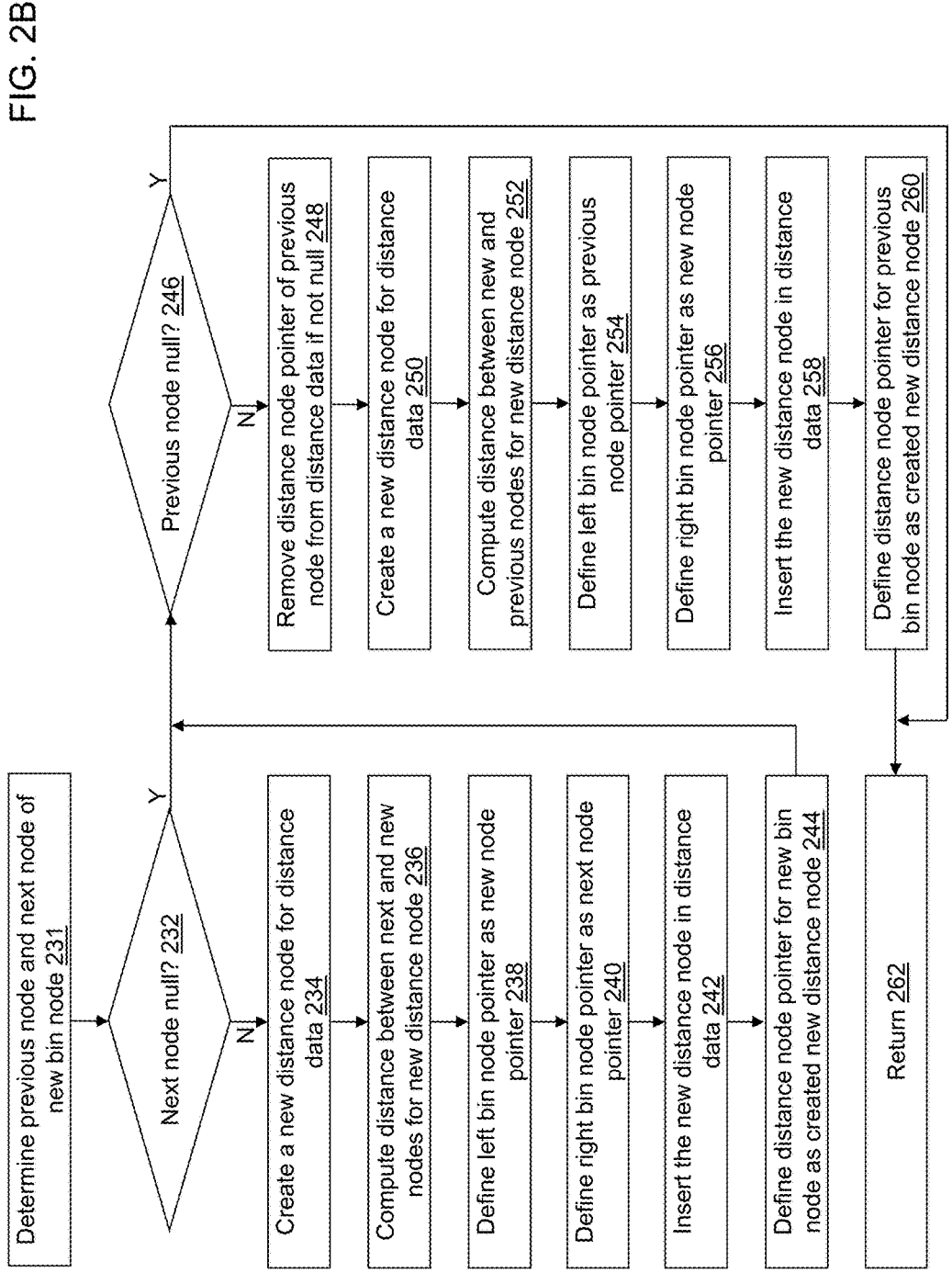

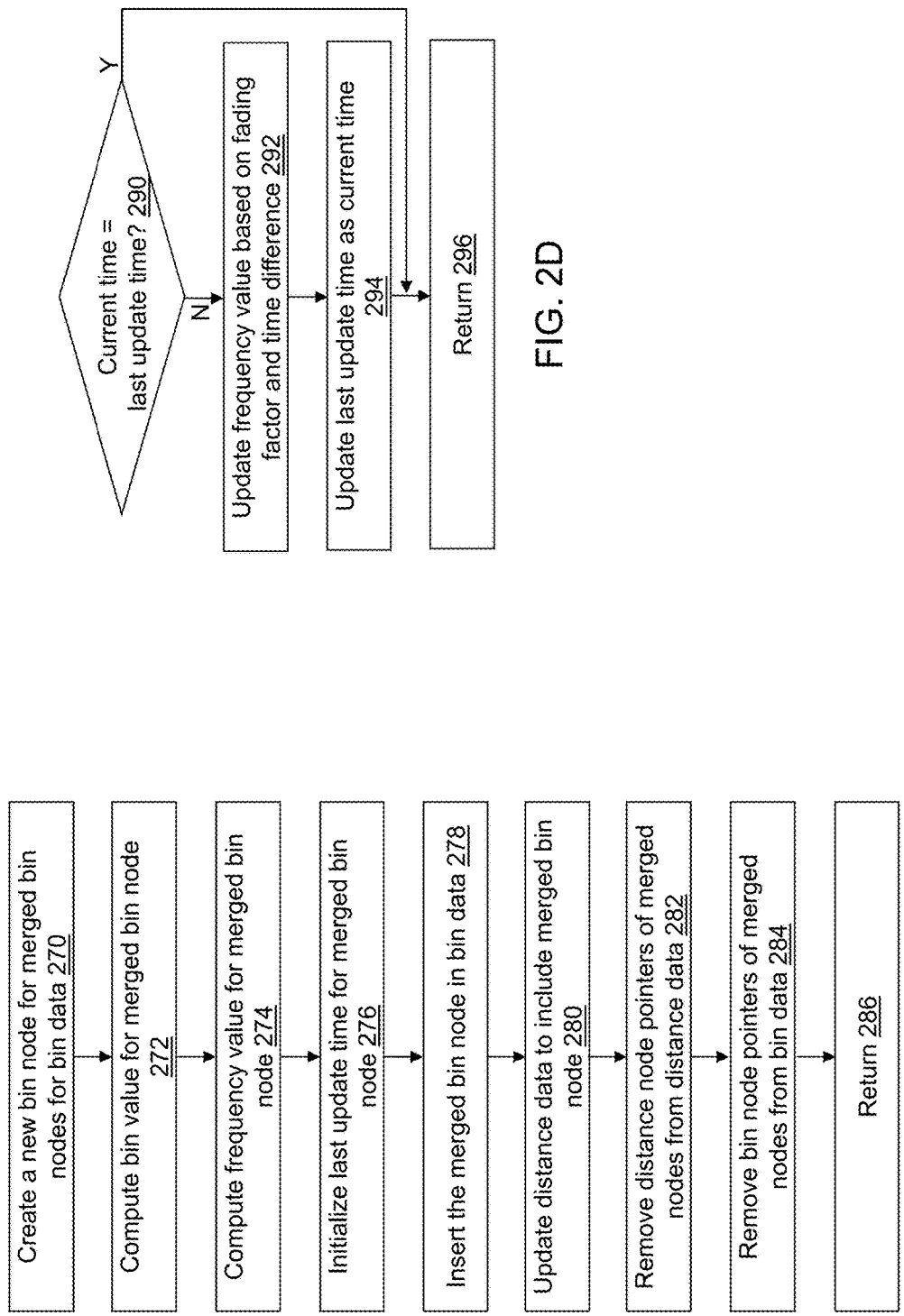

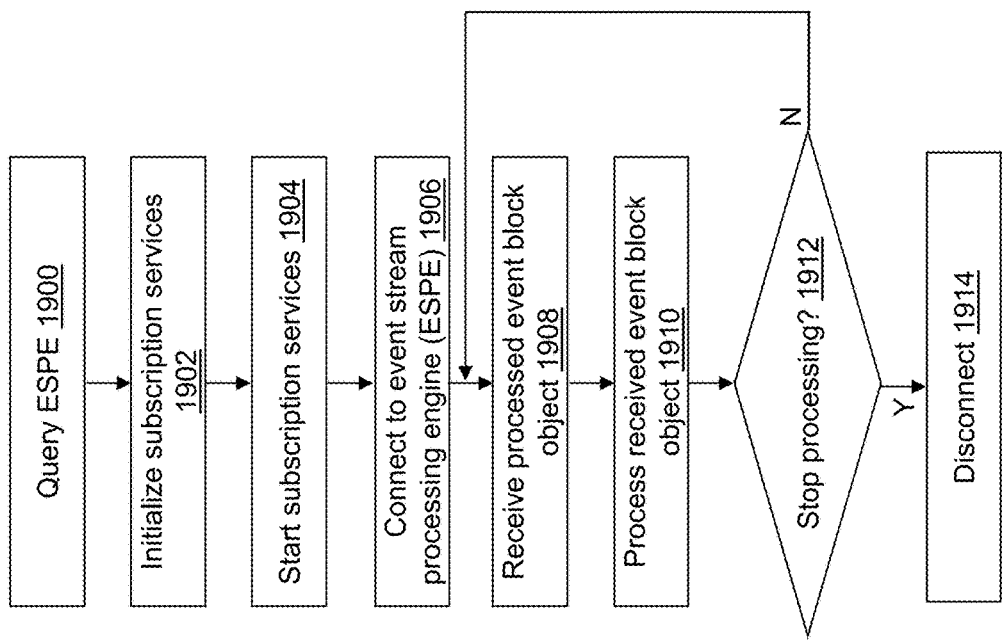

DATA PROCESSING WITH STREAMING DATA

CROSS-REFERENCE TO RELATED APPLICATIONS

The present application claims the benefit of 35 U.S.C. § 119(e) to U.S. Provisional Patent Application No. 62/537,449 filed Jul. 26, 2017 and to U.S. Provisional Patent Application No. 62/544,874 filed Aug. 13, 2017, the entire contents of which are hereby incorporated by reference.

BACKGROUND

The need to summarize large amounts of data is a recurring problem in the area of streaming data analytics.

BRIEF DESCRIPTION OF THE DRAWINGS

Illustrative embodiments of the disclosed subject matter will hereafter be described referring to the accompanying drawings, wherein like numerals denote like elements.

FIGS. 2A, 2B, 2C, and 2D depict a flow diagram illustrating examples of operations performed by the histogram update device of FIG. 1 in accordance with an illustrative embodiment.

FIG. 19 depicts a flow diagram illustrating examples of operations performed by the event subscribing device of FIG. 18 in accordance with an illustrative embodiment.

DETAILED DESCRIPTION

When working with streaming data, a one-pass algorithm that can keep a limited-size summary of an unlimited amount of streaming data points is needed. Histograms are a good way to summarize the streaming data because the distribution of the data is tracked without storing all of the data points. However, when the range of the data is unknown beforehand, a flexible representation of the histogram having a predefined number of bins is needed. For this reason, equal-width binning or equal-height binning for the histogram are not the best approach, which creates a need for a histogram update algorithm that can adapt to distribution changes while being flexible enough to represent data in any range with any number of data points. Furthermore, the histogram update algorithm needs to be fast and scalable to work with a large number of bins.

A histogram update algorithm is described in a paper by Yael Ben-Haim and Elad Tom-Tov, *A Streaming Parallel Decision Tree Algorithm*, 11 The Journal of Machine Learning Research 849-72 (2010) that uses a single pass approach to generate a histogram that is stored as a set of keys and heights, where each key determines a center of a histogram bin and a height that keeps track of a number of points that fall in that bin. The exact width of each bin is unknown. The only assumption is that half of the points belonging to each bin fall to the right of the key and the other half fall to the left. Regarding the time complexity, the algorithm is relatively inefficient because it requires sorting after inserting each new data point, which is an expensive computing operation. Also, the process of merging two bins is expensive because it has to search for a pair of adjacent bins that are closer together than other adjacent bins.

In a streaming environment, it is also beneficial to have a mechanism that forgets (fades) outdated data thereby providing more relevance to the most recent data. A fading algorithm is described in a paper by Raquel Sebastiao et al., *Fading histograms in detecting distribution and concept changes*, 3 Int J Data Sci Anal 183-212 (2017) and in a paper by Raquel Sebastiao et al., *Constructing fading histograms from data streams*, 3(1) Prog. Artif. Intell. 15-28 (2014). The fading algorithms described in the papers by Sebastio require that the range of the data is known beforehand in order to divide the range of the data by the number of bins because they are based on equal-width binning. This is an ineffective feature in a streaming environment because the range of the data may not be known beforehand or may vary a lot during execution. Calculating the histogram over a sliding window as a way to forget the data that is outside the sliding window is also an approach these papers mention, but the sliding window requires storing the data that is inside the sliding window in memory, which can be expensive depending on the window size and data size.

Figure 1:
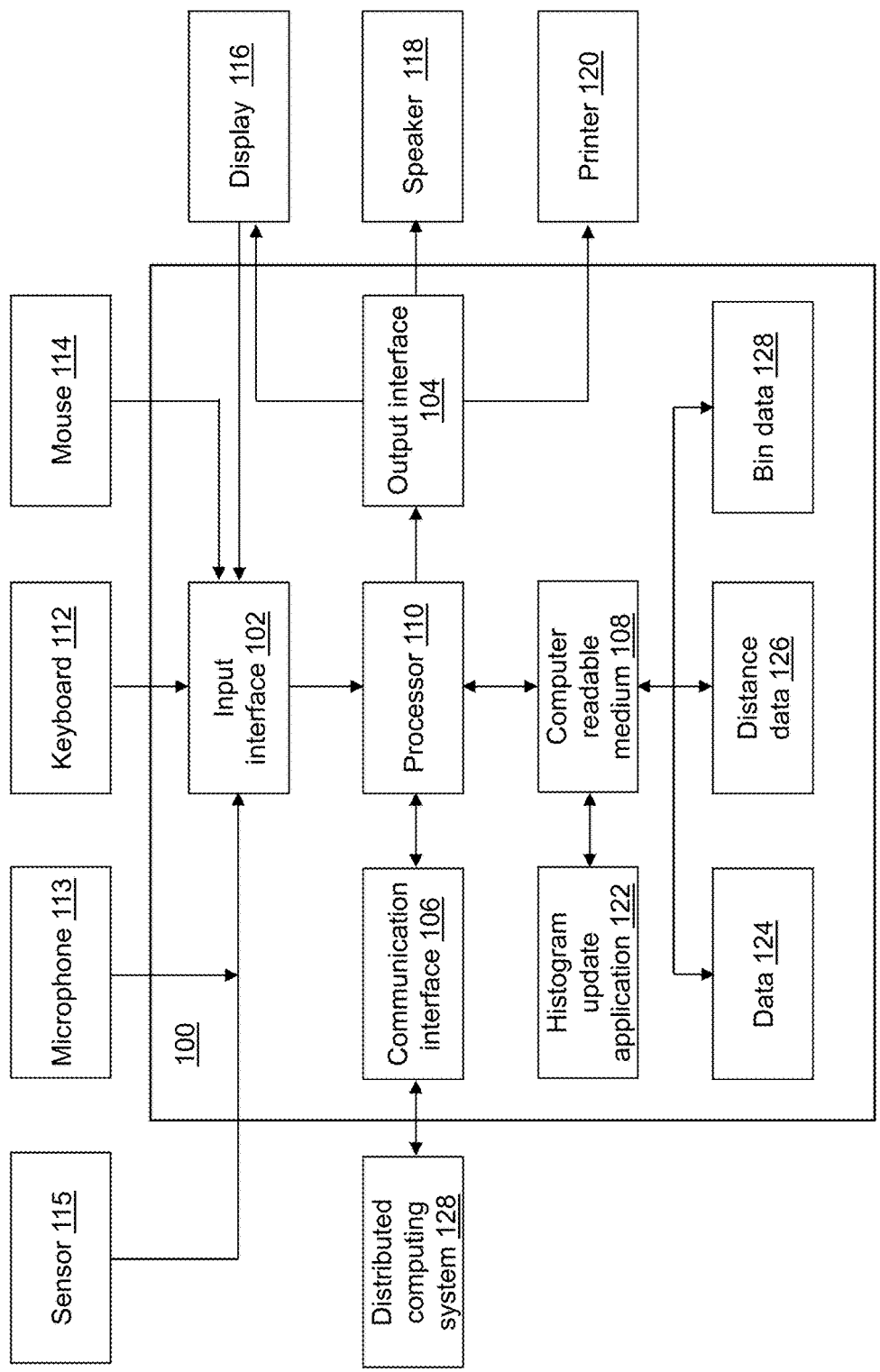
FIG. 1 depicts a block diagram of a histogram update device in accordance with an illustrative embodiment.

Referring to FIG. 1, a block diagram of a histogram update device 100 is shown in accordance with an illustrative embodiment. Histogram update device 100 may include an input interface 102, an output interface 104, a communication interface 106, a non-transitory computer-readable medium 108, a processor 110, a histogram update application 122, data 124, distance data 126, and bin data 128. Fewer, different, and/or additional components may be incorporated into histogram update device 100.

Input interface 102 provides an interface for receiving information from the user or another device for entry into histogram update device 100 as understood by those skilled in the art. Input interface 102 may interface with various input technologies including, but not limited to, a keyboard 112, a microphone 113, a mouse 114, a sensor 115, a display 116, a track ball, a keypad, one or more buttons, etc. to allow the user to enter information into histogram update device 100 or to make selections presented in a user interface displayed on display 116. The same interface may support both input interface 102 and output interface 104. For example, display 116 comprising a touch screen provides a mechanism for user input and for presentation of output to the user. Histogram update device 100 may have one or more input interfaces that use the same or a different input interface technology. The input interface technology further may be accessible by histogram update device 100 through communication interface 106.

Output interface 104 provides an interface for outputting information for review by a user of histogram update device 100 and/or for use by another application or device. For example, output interface 104 may interface with various output technologies including, but not limited to, display 116, a speaker 118, a printer 120, etc. Histogram update device 100 may have one or more output interfaces that use the same or a different output interface technology. The output interface technology further may be accessible by histogram update device 100 through communication interface 106.

Communication interface 106 provides an interface for receiving and transmitting data between devices using various protocols, transmission technologies, and media as understood by those skilled in the art. Communication interface 106 may support communication using various transmission media that may be wired and/or wireless. Histogram update device 100 may have one or more communication interfaces that use the same or a different communication interface technology. For example, histogram update device 100 may support communication using an Ethernet port, a Bluetooth antenna, a telephone jack, a USB port, etc. Data and messages may be transferred between histogram update device 100 and another computing device of a distributed computing system 128 using communication interface 106.

Computer-readable medium 108 is an electronic holding place or storage for information so the information can be accessed by processor 110 as understood by those skilled in the art. Computer-readable medium 108 can include, but is not limited to, any type of random access memory (RAM), any type of read only memory (ROM), any type of flash memory, etc. such as magnetic storage devices (e.g., hard disk, floppy disk, magnetic strips, . . . ), optical disks (e.g., compact disc (CD), digital versatile disc (DVD), . . . ), smart cards, flash memory devices, etc. histogram update device 100 may have one or more computer-readable media that use the same or a different memory media technology. For example, computer-readable medium 108 may include different types of computer-readable media that may be organized hierarchically to provide efficient access to the data stored therein as understood by a person of skill in the art. As an example, a cache may be implemented in a smaller, faster memory that stores copies of data from the most frequently/recently accessed main memory locations to reduce an access latency. Histogram update device 100 also may have one or more drives that support the loading of a memory media such as a CD, DVD, an external hard drive, etc. One or more external hard drives further may be connected to histogram update device 100 using communication interface 106.

Processor 110 executes instructions as understood by those skilled in the art. The instructions may be carried out by a special purpose computer, logic circuits, or hardware circuits. Processor 110 may be implemented in hardware and/or firmware. Processor 110 executes an instruction, meaning it performs/controls the operations called for by that instruction. The term "execution" is the process of running an application or the carrying out of the operation called for by an instruction. The instructions may be written using one or more programming language, scripting language, assembly language, etc. Processor 110 operably couples with input interface 102, with output interface 104, with communication interface 106, and with computer-readable medium 108 to receive, to send, and to process information. Processor 110 may retrieve a set of instructions from a permanent memory device and copy the instructions in an executable form to a temporary memory device that is generally some form of RAM. Histogram update device 100 may include a plurality of processors that use the same or a different processing technology.

Histogram update application 122 performs operations associated with defining distance data 126 and bin data 128 from data 124 that may be stored locally and/or on distributed computing system 128 or may be streamed to histogram update device 100 from distributed computing system 128 and/or sensor 115 and/or another computing device or other type of device. Distance data 126 and bin data 128 are used to maintain data for updating a histogram of data 124 as additional data is received and/or processed. Some or all of the operations described herein may be embodied in histogram update application 122. The operations may be implemented using hardware, firmware, software, or any combination of these methods.

Referring to the example embodiment of FIG. 1, histogram update application 122 is implemented in software (comprised of computer-readable and/or computer-executable instructions) stored in computer-readable medium 108 and accessible by processor 110 for execution of the instructions that embody the operations of histogram update application 122. Histogram update application 122 may be written using one or more programming languages, assembly languages, scripting languages, etc. Histogram update application 122 may be integrated with other analytic tools. As an example, histogram update application 122 may be part of an integrated data analytics software application and/or software architecture such as that offered by SAS Institute Inc. of Cary, N.C., USA. For example, histogram update application 122 may be integrated with one or more SAS software tools such as SAS® Enterprise Miner™, SAS® Factory Miner, Base SAS, SAS/STAT®, SAS® High Performance Analytics Server, SAS® LASR™, SAS® In-Database Products, SAS® Scalable Performance Data Engine, SAS/OR®, SAS/ETS®, SAS® Inventory Optimization, SAS® Inventory Optimization Workbench, SAS® Visual Analytics, SAS® Viya™, SAS In-Memory Statistics for Hadoop®, SAS® Forecast Server, SAS® Event Stream Processing (ESP) all of which are developed and provided by SAS Institute Inc. of Cary, N.C., USA. Data mining and data analytics is applicable in a wide variety of industries.

Histogram update application 122 may be integrated with other system processing tools to automatically process data generated as part of operation of an enterprise, device, system, facility, etc., to monitor changes in data 124 and to provide a warning or alert associated with the monitored data using input interface 102, output interface 104, and/or communication interface 106 so that appropriate action can be initiated in response to changes in the monitored data.

Histogram update application 122 may be implemented as a Web application. For example, histogram update application 122 may be configured to receive hypertext transport protocol (HTTP) responses and to send HTTP requests. The HTTP responses may include web pages such as hypertext markup language (HTML) documents and linked objects generated in response to the HTTP requests. Each web page may be identified by a uniform resource locator (URL) that includes the location or address of the computing device that contains the resource to be accessed in addition to the location of the resource on that computing device. The type of file or resource depends on the Internet application protocol such as the file transfer protocol, HTTP, H.323, etc. The file accessed may be a simple text file, an image file, an audio file, a video file, an executable, a common gateway interface application, a Java applet, an extensible markup language (XML) file, or any other type of file supported by HTTP.

Data 124 may include a plurality of rows and a plurality of columns. The plurality of rows may be referred to as observation vectors or records (observations), and the columns may be referred to as variables. Data 124 may be transposed. The plurality of variables may define multiple dimensions for each observation vector. An observation vector $x_j$ may include a value for each of the plurality of variables associated with the observation j, where j= 1, . . . , $N_i$, where $N_i$ is a number of observations in data 124.

Each variable of the plurality of variables $v_i$ may describe a characteristic of a physical object. For example, if data 124 includes data related to operation of a vehicle, the variables may include an oil pressure, a speed, a gear indicator, a gas tank level, a tire pressure for each tire, an engine temperature, a radiator level, etc. that may be captured by one or more sensors 115. Data 124 may include data captured as a function of time for one or more physical objects. Each observation vector $x_j$ includes observation vector values $o_{j,l}$, where l=1, . . . , $v_i$, j=1, . . . , $N_i$, where $v_i$ is a number of the plurality of variables that make up each observation vector in data 124.

Data 124 may be generated by and/or captured from a variety of sources including the one or more sensors 115 of the same or different type, one or more computing devices, other types of devices, etc. Data 124 may be received directly or indirectly from the source and may or may not be pre-processed in some manner. For example, data 124 may be pre-processed using an event stream processor such as the SAS® Event Stream Processing Engine (ESPE), developed and provided by SAS Institute Inc. of Cary, N.C., USA. As used herein, data 124 may include any type of content represented in any computer-readable format such as binary, alphanumeric, numeric, string, markup language, etc. Data 124 may be organized using delimited fields, such as comma or space separated fields, fixed width fields, using a SAS® dataset, etc. The SAS dataset may be a SAS® file stored in a SAS® library that a SAS® software tool creates and processes. The SAS dataset contains data values that are organized as a table of observations (rows) and variables (columns) that can be processed by one or more SAS software tools.

Data 124 may be stored on computer-readable medium 108 and/or on one or more computer-readable media of distributed computing system 128 and accessed by or received by histogram update device 100 using communication interface 106, input interface 102, and/or output interface 104. Data 124 may include sensor measurements or signal values captured by a sensor, may be generated or captured in response to occurrence of an event or a transaction, generated by a device such as in response to an interaction by a user with the device, etc. Data 124 may include any type of content represented in any computer-readable format such as binary, alphanumeric, numeric, string, markup language, etc. The content may include textual information, graphical information, image information, audio information, numeric information, etc. that further may be encoded using various encoding techniques as understood by a person of skill in the art. Data 124 may be captured at different time points periodically, intermittently, when an event occurs, etc. One or more columns of data 124 may include a time value and/or a date value.

Data 124 may include data captured at a high data rate such as 200 or more observations per second for one or more physical objects. For example, data 124 may be generated as part of the Internet of Things (IoT), where things (e.g., machines, devices, phones, sensors) can be connected to networks and the data from these things collected and processed within the things and/or external to the things before being stored as data 124. For example, the IoT can include sensors in many different devices and types of devices, and high value analytics can be applied to identify hidden relationships and drive increased efficiencies. This can apply to both big data analytics and real-time analytics. Some of these devices may be referred to as edge devices, and may involve edge computing circuitry. These devices may provide a variety of stored or generated data, such as network data or data specific to the network devices themselves. Again, some data may be processed with an ESPE, which may reside in the cloud or in an edge device before being stored in data 124 or transmitted to histogram update device 100. As discussed further below, an ESPE may be instantiated at histogram update device 100 to receive data 124.

Data 124 may be stored using various data structures as known to those skilled in the art including one or more files of a file system, a relational database, one or more tables of a system of tables, a structured query language database, etc. on histogram update device 100 or on distributed computing system 128 that may be the same or different. Histogram update device 100 may coordinate access to data 124 that is distributed across distributed computing system 128 that may include one or more computing devices. For example, data 124 may be stored in a cube distributed across a grid of computers as understood by a person of skill in the art. As another example, data 124 may be stored in a multi-node Hadoop® cluster. For instance, Apache™ Hadoop® is an open-source software framework for distributed computing supported by the Apache Software Foundation. As another example, data 124 may be stored in a cloud of computers and accessed using cloud computing technologies, as understood by a person of skill in the art. The SAS® LASR™ Analytic Server may be used as an analytic platform to enable multiple users to concurrently access data stored in data 124. The SAS® Viya™ open, cloud-ready, in-memory architecture also may be used as an analytic platform to enable multiple users to concurrently access data stored in data 124. Some systems may use SAS In-Memory Statistics for Hadoop® to read big data once and analyze it several times by persisting it in-memory for the entire session. Some systems may be of other types and configurations.

Figure 3:
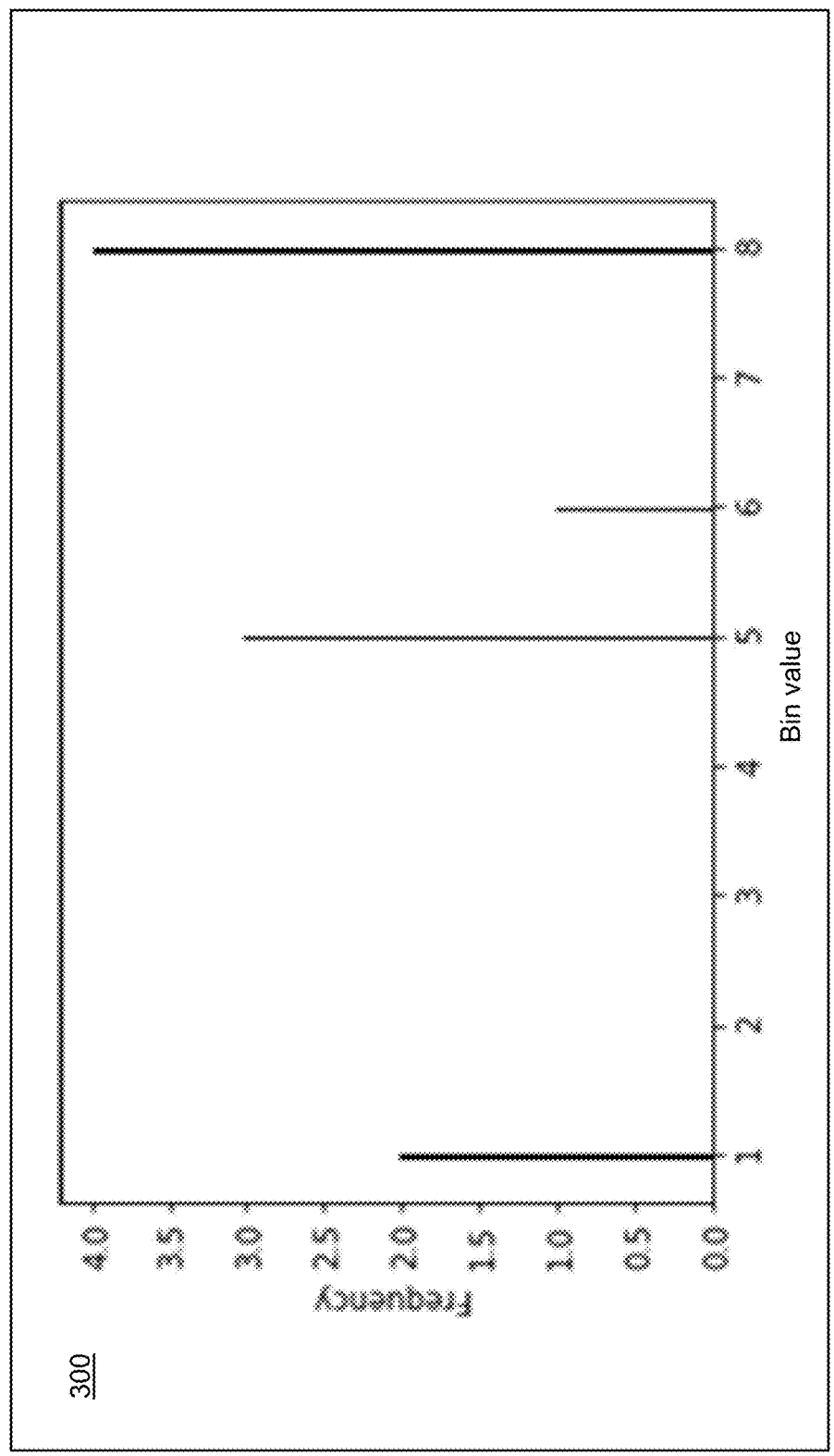
FIG. 3 shows a histogram in accordance with an illustrative embodiment.

Referring to FIGS. 2A, 2B, 2C, and 2D, example operations associated with histogram update application 122 are described. For example, histogram update application 122 may be used to create distance data 126 and bin data 128 from data 124 that can be used to create a histogram such as a histogram 300 shown referring to FIG. 3. Histogram 300 describes an approximation of an underlying probability distribution of a variable of data 124 selected for monitoring. Though the axes may be reversed, histogram 300 shows a bin value on an x-axis the values of which are based on the variable selected for monitoring and a frequency value on a y-axis that is a count of a number of occurrences of the associated bin value.

Referring again to FIGS. 2A, 2B, 2C, and 2D, additional, fewer, or different operations may be performed depending on the embodiment of histogram update application 122. The order of presentation of the operations of FIGS. 2A, 2B, 2C, and 2D is not intended to be limiting. Although some of the operational flows are presented in sequence, the various operations may be performed in various repetitions, concurrently (in parallel, for example, using threads and/or distributed computing system 128), and/or in other orders than those that are illustrated. For example, a user may execute histogram update application 122, which causes presentation of a first user interface window, which may include a plurality of menus and selectors such as drop down menus, buttons, text boxes, hyperlinks, etc. associated with histogram update application 122 as understood by a person of skill in the art. The plurality of menus and selectors may be accessed in various orders. An indicator may indicate one or more user selections from a user interface, one or more data entries into a data field of the user interface, one or more data items read from computer-readable medium 108 or otherwise defined with one or more default values, etc. that are received as an input by histogram update application 122.

Referring to FIG. 2A, in an operation 200, a first indicator may be received that indicates a maximum number of bins value $N_{bx}$. For example, a user may interact with a user interface to select or enter the maximum number of bins value $N_{bx}$. In an alternative embodiment, the first indicator may not be received. For example, a default value may be stored, for example, in computer-readable medium 108 and used automatically.

In operation 202, a second indicator may be received that indicates data 124 and/or a variable of data 124 to monitor using distance data 126 and bin data 128. A plurality of variables may be monitored with each variable having an associated distance data 126 and bin data 128. The second indicator may indicate a location and a name of data 124 and/or a column name(s) or column number(s) of the variable to monitor. As an example, the second indicator may be received by histogram update application 122 after selection from a user interface window or after entry by a user into a user interface window. In an alternative embodiment, data 124 may not be selectable. For example, a most recently created dataset may be used automatically. For example, a grid, a cube, a cloud, a Hadoop® cluster, a relational database, a file system, etc. location may be used automatically as a location/name of data 124. As another example, data 124 may be streamed to histogram update device 100. A first or a last column may be used by default if no variable selection is indicated by the second indicator as the variable to monitor.

In an operation 204, a third indicator may be received that indicates a fading factor value α. For example, a user may interact with a user interface to select or enter the fading factor value α, where 0<α≤1. In an alternative embodiment, the third indicator may not be received. For example, a default value may be stored, for example, in computer-readable medium 108 and used automatically. The fading factor value α defines a rate at which previous data is forgotten such that the importance of previous data decreases with time.

In an operation 206, distance data 126 and bin data 128 are initialized. Distance data 126 and bin data 128 may be based on the same or different data structures. For example, either or both of distance data 126 and/or bin data 128 may be an array, a linked list, an AVL tree, a red-black tree, etc. In an illustrative embodiment, both distance data 126 and bin data 128 are implemented using AVL trees. An AVL tree is a self-balancing binary search tree where a height of two child sub-trees of any node of the AVL tree differs by at most one. If at any time they differ by more than one, rebalancing is done to restore this property.

Bin data 128 stores data associated with the histogram data points (a bin value and a frequency value) while distance data 126 stores a distance between adjacent bins in bin data 128. As a result, distance data 126 includes one less node than bin data 128. Each bin node included in bin data 128 may include a bin value $k_b$, a frequency value $f_b$, a distance node pointer $DN_p$, and a last update time value $T_{lu}$. The bin value $k_b$ represents a center value of the histogram bin, and the frequency value $f_b$ represents a height associated with the center value. The distance node pointer $DN_p$ points to a distance node included in distance data 126 that stores a distance between the associated bin node and a next bin to the right of the associated bin node. The distance node pointer references a location in memory, and obtaining the value stored at that memory location is known as dereferencing the pointer as understood by a person of skill in the art. The location in memory points to one or more data values associated with the distance node in distance data 126. Bin data 128 is maintained in sorted order such that $k_{b1}<k_{b2}<k_{b3}< \ldots <k_{bN_{BN}}$, where $N_{BN}$ is a number of bin nodes included in bin data 128.

Each distance node included in distance data 126 may include a distance value d, a left node pointer $LN_p$, and a right node pointer $RN_p$. The left node pointer $LN_p$ is a pointer to a left bin node included in bin data 128 that stores the associated left bin node data. The right node pointer $RN_p$ is a pointer to a right bin node included in bin data 128 that stores the associated right bin node data. The left bin node and the right bin node are adjacent bins of the histogram stored in bin data 128. The distance value d is a difference between the bin value $k_{bl}$ of the left bin node and the bin value $k_{br}$ of the right bin node, or $d=k_{br}-k_{bl}$. The left node pointer $LN_p$ references a location in memory that stores the bin value $k_{bl}$, the frequency value $f_{bl}$, the distance node pointer $DN_{pl}$, and the last update time value $T_{lul}$ of the left bin node. The right node pointer references a location in memory that stores the bin value $k_{br}$, the frequency value $f_{br}$, the distance node pointer $DN_{pr}$, and the last update time value $T_{lur}$ of the right bin node. Distance data 126 is maintained in sorted order or traversed in order such that $d_1 \leq d_2 \leq d_3 \leq \ldots \leq d_{N_{DN}}$ where $N_{DN}$ is a number of distance nodes included in distance data 126 and $N_{DN}=N_{BN}-1$.

Left and right are merely used to describe the relationship between adjacent bins relative to an axis with numerical values increasing from right to left and is not intended to be limiting. For example, the data may be indexed from left to right, right to left, up to down, down to up, etc.

Nodes of distance data 126 are positionally unrelated to nodes of bin data 128, which is why each distance node includes pointers to the bin nodes used to define the distance value it stores and why each bin node has a pointer to the distance node that stores the corresponding distance between it and its adjacent (next) bin node on the right. For example, a first node of distance data 126 may or may not have any relationship with a first node of bin data 128. Because $N_{DN}=N_{BN}-1$, a last bin node points to Null since there is no next node.

In an operation 208, a data point value p and a weight value w are received. For example, the data point value p and the weight value w may be streamed to update histogram device 100. As another example, the data point value p and the weight value w may be received by reading a next value from data 124. In an alternative embodiment, the weight value w may not be received and may instead be assumed to have a default value of one. Instead of sending the same data point value p w times, the weight value w is used to do this in a single iteration.

In an operation 209, a current time $T_c$ is updated, for example, based on a clock maintained by update histogram device 100, based on a value read from data 124, or may be incremented from an initial value such as zero with a predefined value such as one on each iteration of operation 209.

In an operation 210, a new bin node may be created. For example, memory may be allocated to store a new bin value $k_{bn}$, a new frequency value $f_{bn}$, a new distance node pointer $DN_{pn}$, and a new last update time value $T_{lun}$, and a new bin node pointer $P_{bn-new}$ is defined to point to the created new bin node.

In an operation 212, new bin value $k_{bn}$ is defined as data point value p such that $k_{bn}=p$.

In an operation 214, the new bin node pointer is inserted into bin data 128 in sorted order based on the new bin value $k_{bn}$. Specific "Insert" operations depend on the type of data structure used to store bin data 128 as understood by a person of skill in the art.

In an operation 216, a determination is made concerning whether or not the new bin value $k_{bn}$ is already associated with a bin node of bin data 128. When the new bin value $k_{bn}$ is already associated with a bin node of bin data 128, processing continues in an operation 218. When the new bin value $k_{bn}$ is not already associated with a bin node of bin data 128, processing continues in an operation 220. For illustration, the "Insert" operations traverse bin data 128 comparing the new bin value $k_{bn}$ to the bin value $k_b$ of each bin node until a bin node has a bin value $k_b$ that is greater than the new bin value $k_{bn}$. If a match is found, the bin node pointer of the matching bin node is identified as $P_{bn}$.

In operation 218, weight value w is added to $f_b$ of $P_{bn}$, and processing continues in operation 224.

In operation 220, $f_b$ of $P_{bn-new}$ is initialized to weight value w and $T_{lu}$ of $P_{bn-new}$ is initialized to $T_c$. $N_{BN}$ is also incremented.

In an operation 222, distance data 126 is updated to include $P_{bn-new}$. For illustration, operations 231 to 262 shown referring to FIG. 2B and discussed further below may be performed to update distance data 126.

In an operation 224, a determination is made concerning whether or not $N_{BN}>N_{bx}$. When $N_{BN}>N_{bx}$, processing continues in an operation 226. When $N_{BN} \leq N_{bx}$, processing continues in an operation 230.

In operation 226, closest bin nodes are selected. For example, because distance data 126 is sorted based on the distance value d, a closest distance pointer $P_{dc}$ is a first distance node stored in distance data 126. Left node pointer $LN_{pc}$ and right node pointer $RN_{pc}$ of $P_{dc}$ are selected as the closest bin nodes. The terms "first" and "last" reference the sorted order of the data structure used to store each data node included in bin data 128 and distance data 126, where the "first" node is a node that holds a smallest distance value of distance data 126 and a smallest data point value of bin data 128 and the "last" node is a node that holds a largest distance value of distance data 126 and a largest data point value of bin data 128.

In an operation 228, $f_{bl}$ of left node pointer $LN_{pc}$ and $f_{br}$ of right node pointer $RN_{pc}$ of $P_{dc}$ are each updated based on fading factor value $\alpha$. In an alternative embodiment, fading may not be performed. For illustration, operations 290 to 296 shown referring to FIG. 2D may be performed on both $f_{bl}$ of left node pointer $LN_{pc}$ and $f_{br}$ of right node pointer $RN_{pc}$ of $P_{dc}$ as discussed further below to fade the frequency values.

In an operation 229, the closest bin nodes, left node pointer and right node pointer $RN_{pc}$ of $P_{dc}$, are merged into a single bin node. For illustration, operations 270 to 286 shown referring to FIG. 2C and discussed further below may be performed to merge the closest bin nodes.

In an operation 230, bin data 128 may be output, for example, by presenting a histogram based on the bin value $k_b$ and the frequency value $f_b$ of each bin node on display 126. In an alternative embodiment, the histogram may be output only when requested by a user, when all of data 124 is processed, etc. For example, bin data 128 may be output by storing bin data 128 to computer-readable medium 108 or another computer-readable medium of distributed computing system 128. In addition, or in the alternative, bin data 128 may be presented on display 116, for example, graphically in a histogram, printed on printer 120, sent to another computing device using communication interface 106, etc. Processing continues in operation 208 to continue processing new data point and weight values.

Referring to FIG. 2B, in an operation 231, a previous bin node $P_{bn-previous}$ and a next bin node $P_{bn-next}$ of $P_{bn-new}$ are determined.

In an operation 232, a determination is made concerning whether or not $P_{bn-next}$ is Null. When $P_{bn-next}$ is Null, $P_{bn-new}$ is a last node of bin data 128, and processing continues in an operation 246. When $P_{bn-next}$ is not Null, processing continues in an operation 234.

In an operation 234, a new distance node may be created. For example, memory may be allocated to store a new distance value $d_n$, a new left node pointer $LN_{pn}$, and a new right node pointer $RN_{pn}$, and a new distance node pointer $P_{d-new}$ is defined.

In an operation 236, the new distance value $d_n$ is defined as the bin value $k_{b-next}$ of next bin node $P_{bn-next}$ minus the new bin value $k_{bn}$ of the new bin node $P_{bn-new}$, or $d_n = k_{b-next} - k_{bn}$.

In an operation 238, the new left node pointer $LN_{pn}$ is defined as $P_{bn-new}$.

In an operation 240, the new right node pointer $RN_{pn}$ is defined as $P_{bn\text{-}next}$.

In an operation 242, the new distance node pointer $P_{d\text{-}new}$ is inserted into distance data 126 in sorted order based on the new distance value $d_n$.

In an operation 244, the distance node pointer $DN_p$ of $P_{bn\text{-}new}$ is defined as the new distance node pointer $P_{d\text{-}new}$.

In operation 246, a determination is made concerning whether or not $P_{bn\text{-}previous}$ is Null. When $P_{bn\text{-}previous}$ is Null, $P_{bn\text{-}new}$ is a first node of bin data 128, and processing continues in an operation 262. When $P_{bn\text{-}previous}$ is not Null, processing continues in an operation 248.

In operation 248, the distance node pointer $DN_p$ of $P_{bn\text{-}previous}$ is removed from distance data 126 if it is not Null.

In an operation 250, a second new distance node may be created. For example, memory may be allocated to store a second new distance value $d_{2n}$, a second new left node pointer $LN_{2pn}$, and a second new right node pointer $RN_{2pn}$, and a second new distance node pointer $P_{2d\text{-}new}$ is defined.

In an operation 252, the second new distance value $d_{2n}$ is defined as the new bin value $k_{bn}$ of the new bin node $P_{bn\text{-}new}$ minus the bin value $k_{b\text{-}previous}$ of previous bin node $P_{bn\text{-}previous}$, or $d_{2n}=k_{bn}-k_{b\text{-}previous}$.

In an operation 254, the second new left node pointer $LN_{2pn}$ is defined as $P_{bn\text{-}previous}$.

In an operation 256, the second new right node pointer $RN_{2pn}$ is defined as $P_{bn\text{-}new}$.

In an operation 258, the second new distance node pointer $P_{2d\text{-}new}$ is inserted into distance data 126 in sorted order based on the second new distance value $d_{2n}$.

In an operation 260, distance node pointer $DN_p$ of $P_{bn\text{-}previous}$ is defined as the second new distance node pointer $P_{2d\text{-}new}$.

In operation 262, processing continues with a next operation subsequent to the update distance data call. For example, processing continues in operation 224 of FIG. 2A or in an operation 282 of FIG. 2C.

Referring to FIG. 2C, in an operation 270, a merged bin node may be created for the merged bin nodes, left node pointer $LN_{pc}$ and right node pointer $RN_{pc}$ of $P_{dc}$. For example, memory may be allocated to store a new bin value $k_{bn}$, a new frequency value $f_{bn}$, a new distance node pointer $DN_{pn}$, and a new last update time value $T_{lun}$, and a merged bin node pointer $P_{bn\text{-}mrg}$ is defined.

In an operation 272, new bin value $k_{bn}$ of merged bin node pointer $P_{bn\text{-}mrg}$ is computed as $k_{bn}=(k_{b1}*f_{b1}+k_{b2}*f_{b2})/(f_{b1}+f_{b2})$, where $k_{b1}$ is $k_b$ of left node pointer $LN_{pc}$, $f_{b1}$ is $f_b$ of left node pointer $LN_{pc}$, $k_{b2}$ is $k_b$ of right node pointer $RN_{pc}$, and $f_{b2}$ is $f_b$ of right node pointer $RN_{pc}$. The new bin value $k_{bn}$ of merged bin node pointer $P_{bn\text{-}mrg}$ is an average of the merged values.

In an operation 274, a new frequency value $f_{bn}$ of merged bin node pointer $P_{bn\text{-}mrg}$ is computed as $f_{bn}=f_{b1}+f_{b2}$.

In an operation 276, $T_{lu}$ of $P_{bn\text{-}mrg}$ is initialized to $T_c$.

In an operation 278, the merged bin node pointer $P_{bn\text{-}mrg}$ is inserted into bin data 128 in sorted order based on the new bin value $k_{bn}$ of merged bin node pointer $P_{bn\text{-}mrg}$.

In an operation 280, distance data 126 is updated to include $P_{bn\text{-}mrg}$. For illustration, operations 231 to 262 shown referring to FIG. 2B and discussed above may be performed to update distance data 126.

In an operation 282, distance node pointer $DN_p$ of left node pointer $LN_{pc}$ and distance node pointer $DN_p$ of right node pointer $RN_{pc}$ are removed from distance data 126.

In an operation 284, left node pointer $LN_{pc}$ and right node pointer $RN_{pc}$ are removed from bin data 128.

In operation 286, processing continues with a next operation subsequent to the merge bin nodes call. For example, processing continues in operation 230 of FIG. 2A.

Referring to FIG. 2D, in an operation 290, a determination is made concerning whether or not $T_c=T_{lu}$ of the bin node to be faded. When $T_c=T_{lu}$, processing continues in an operation 296. When $T_c \ne T_{lu}$, processing continues in an operation 292.

In an operation 292, the frequency value $f_{bn}$ of the bin node to be faded is computed as $f_{bn}=f_{bn}*\alpha^{(T_c-T_{lu})}$.

In an operation 294, $T_{lu}$ of the associated bin node is reset to $T_c$, $T_{lu}=T_c$.

In operation 296, processing continues with a next operation subsequent to the call to fade the frequency value. For example, processing continues in operation 229 of FIG. 2A.

Figure 4:
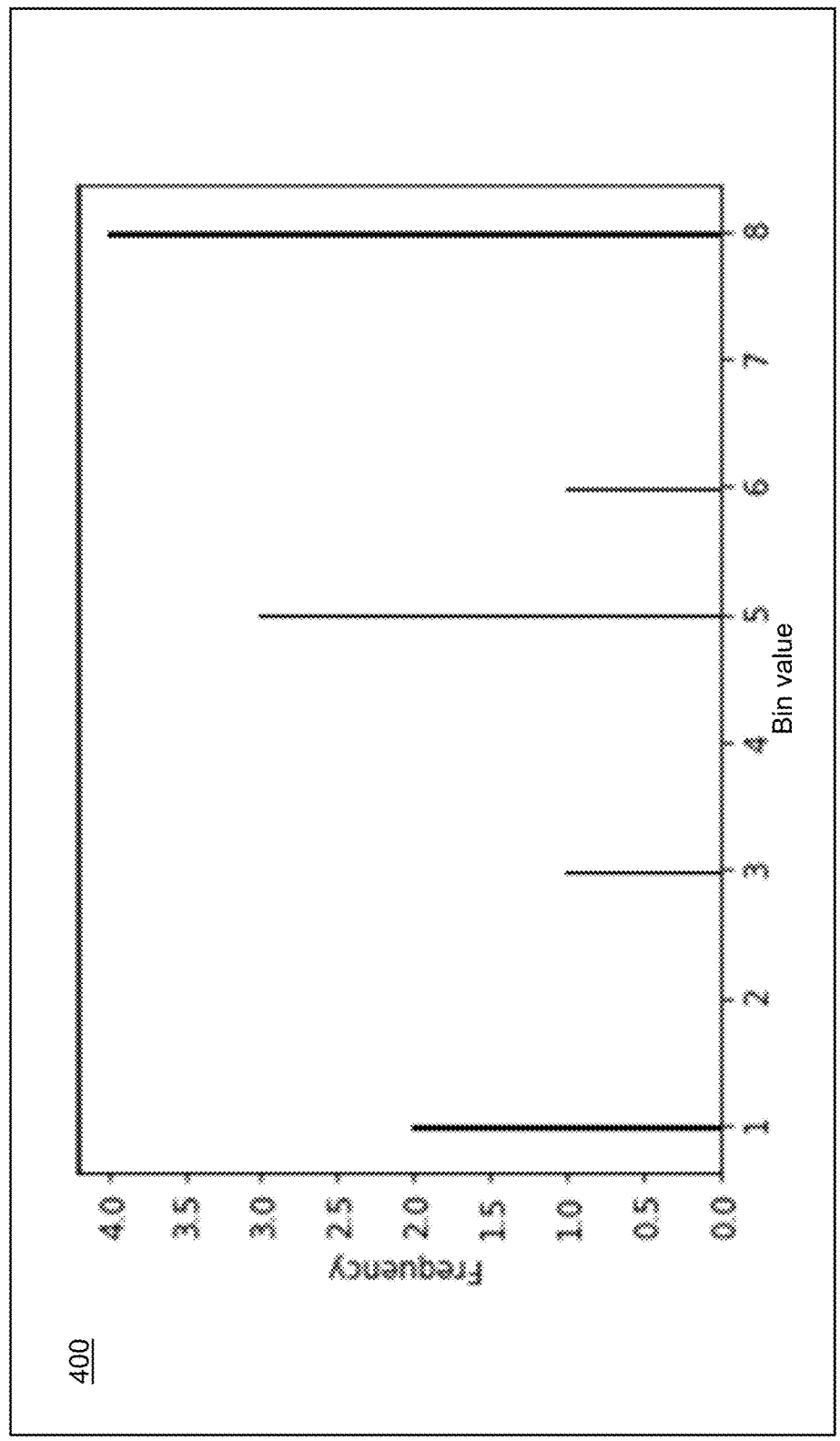
FIG. 4 shows the histogram of FIG. 3 updated to include an additional point in accordance with an illustrative embodiment.
Figure 5:
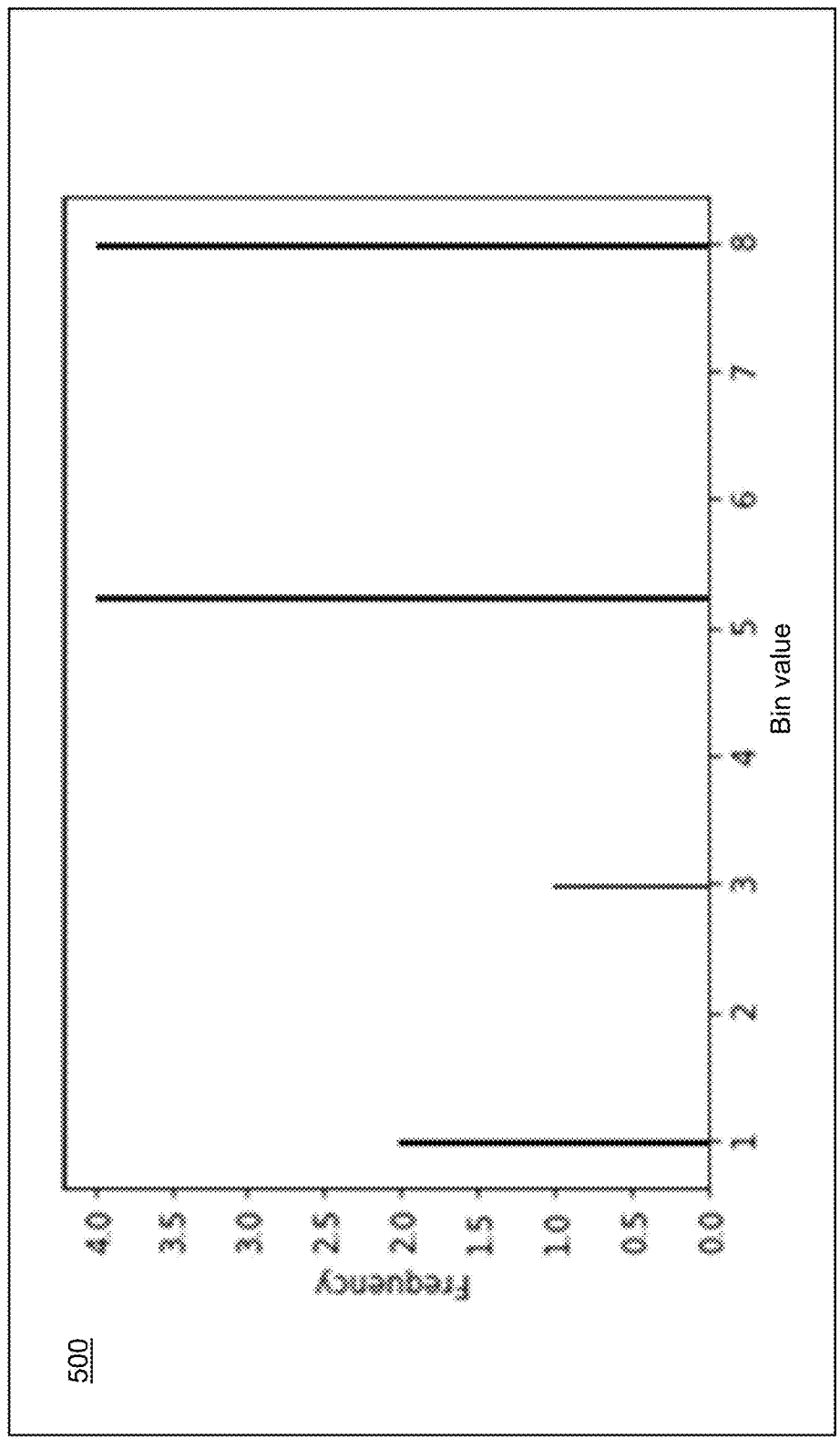
FIG. 5 shows the histogram of FIG. 4 updated to include an additional point that results in merged bins of the histogram of FIG. 4 in accordance with an illustrative embodiment.

For illustration, referring to FIG. 4, a first updated histogram 400 graphically shows an update to histogram 300 (bin data 128) to include a data point value p=3 and a weight value w=1. Referring to FIG. 5, a second updated histogram 500 graphically shows an update to first updated histogram 400 (bin data 128) to merge the closest bins at $k_b$=5 and at $k_b$=6 to form a new bin at $k_b$=(5*3+6*1)/(3+1)=5.25 with $f_b$=3+1=4.

To summarize, histogram update application 122 creates a new bin node using a value of a new data point as a bin value $k_b$ that also acts as the key for the bin node on which bin data 128 is maintained in sorted order when new bin nodes are inserted into bin data 128. When a new bin node is added, the operations of FIG. 2B are performed to update distance data 126, which is maintained in sorted order based on a distance between adjacent (left-right) bin nodes. When the value of the new data point is not new, the frequency value $f_b$ of the associated bin node is incremented based on a weight value. When $N_{BN}>N_{bx}$, the operations of FIG. 2C merge the closest bin nodes.

To summarize the operations of FIG. 2B, the affected pointers and nodes in distance data 126 are updated by taking the new bin node, selecting its previous bin node and its next bin node, and updating the distances between bin nodes. If the next bin node is Null, the new bin node is a last bin node of bin data 128. Otherwise, a new distance node is created for the next bin node, a new distance value d is computed between the new bin node and the next bin node, the pointers, $LN_p$ and $RN_p$, to the new bin node and the next bin node are stored, and the new distance node is inserted into distance data 126 based on the value of d. If the previous bin node is Null, the new bin node is a first bin node of bin data 128, and processing is complete. Otherwise, a new distance node is created for the previous bin node, a new distance value d is computed between the new bin node and the previous bin node, the pointers to the new bin node and the previous bin node are stored, and the new distance node is inserted into distance data 126 based on the value of d.

To summarize the operations of FIG. 2C, a new bin node is created with a bin value $k_b$ that is a weighted average of the two bin nodes being merged and a frequency value $f_b$ that is a sum of the frequencies of the two bin nodes being merged. The operations of FIG. 2B are called to update distance data 126 based on the new bin node, and the merged nodes are removed from bin data 128 and distance data 126.

To summarize the operations of FIG. 2D, the fading factor is applied based on a time difference between a current time and a last update time of the bin node. The fading factor adjusts the frequency value $f_b$ of the bin node to reduce the relevance of older data in which the time difference is greater. In an illustrative embodiment, the fading update may only be performed when a request to retrieve the histogram is received or when bins are merged. Before retrieving the histogram, the fading update of all the bins in the histogram is performed though this is not a significant time penalty because all of the bins are retrieved anyway. When merging two bins, only the frequency of the two bin nodes being merged is updated. Therefore, there is no time complexity penalty when fading is applied.

Figure 6A:
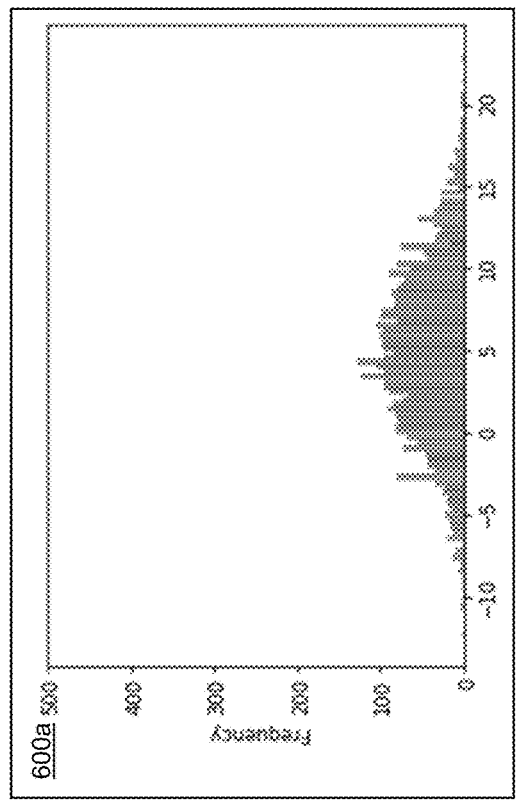
FIGS. 6A and 6B show a histogram after 5,000 data points without fading applied and with fading applied, respectively, in accordance with an illustrative embodiment.
Figure 6B:
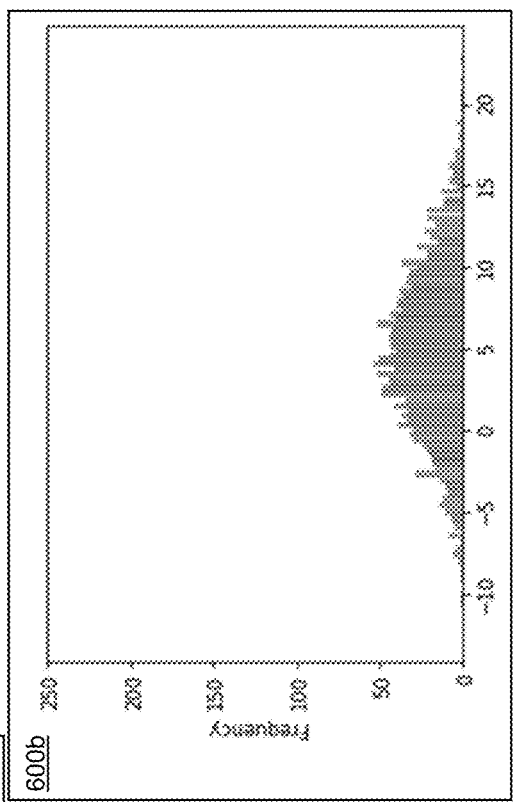

For illustration, FIGS. 6A and 6B show a first histogram 600a after 5,000 data points without fading applied and a second histogram 600b after 5,000 data points with fading applied, respectively, in accordance with an illustrative embodiment. Data 124 was generated from two different normal distributions with a mean value of five and a standard deviation of five. The fading factor α=0.9995 was used to compute second histogram 600b. The maximum number of bins $N_{bx}$=100 was used. A width of each bin was defined manually as a function of a minimum and a maximum observed value and the number of bins $N_{BN}$ though the actual width was not known.

Figure 7A:
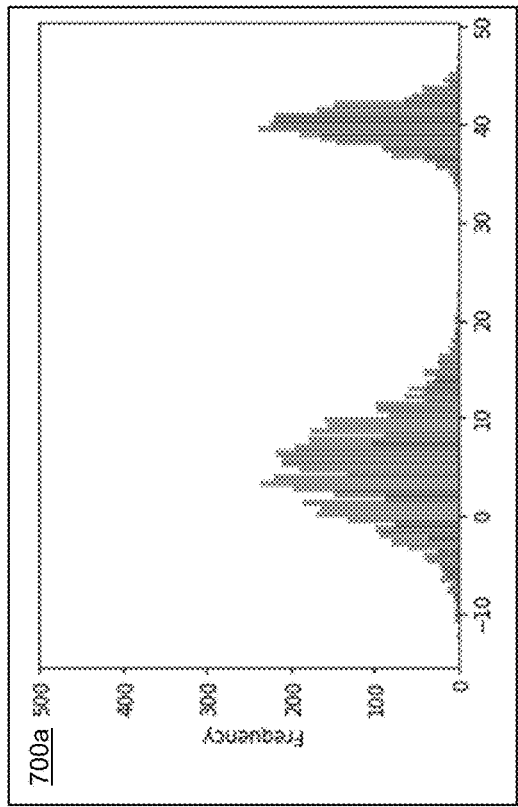
FIGS. 7A and 7B show a histogram after 7,500 data points without fading applied and with fading applied, respectively, in accordance with an illustrative embodiment.
Figure 7B:
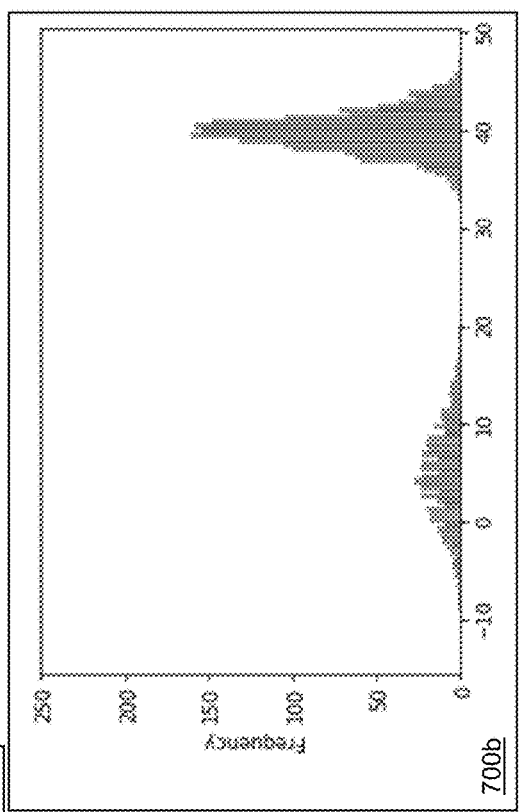

For further illustration, FIGS. 7A and 7B show a third histogram 700a after 2,500 additional data points without fading applied and a fourth histogram 700b after 2,500 additional data points with fading applied, respectively, in accordance with an illustrative embodiment. The 2,500 additional data points added to data 124 were generated from two different normal distributions with a mean value of 40 and a standard deviation of two.

Figure 8A:
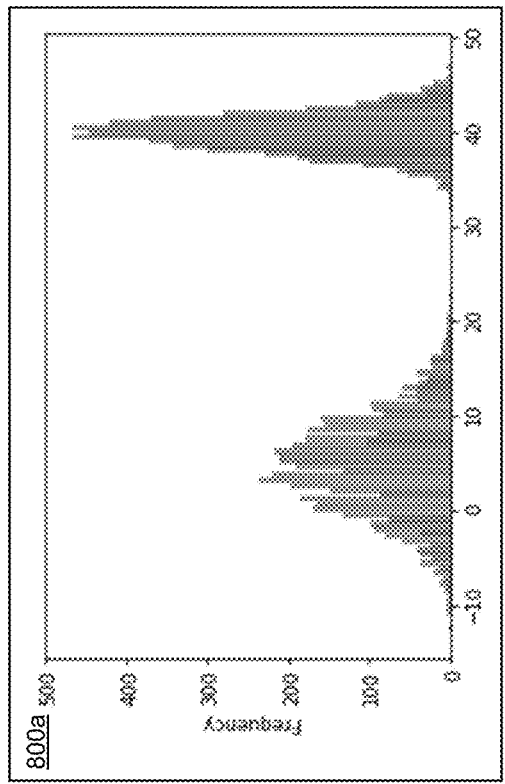
FIGS. 8A and 8B show a histogram after 10,000 data points without fading applied and with fading applied, respectively, in accordance with an illustrative embodiment.
Figure 8B:
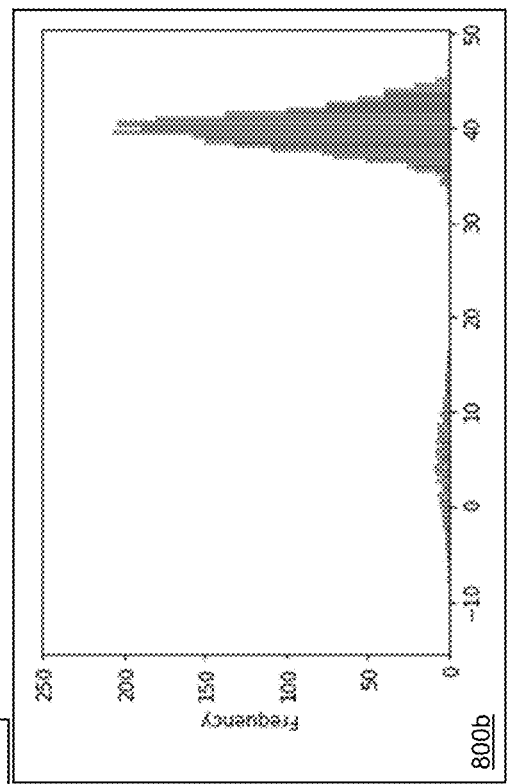

For further illustration, FIGS. 8A and 8B show a fifth histogram 800a after 2,500 additional data points without fading applied and a sixth histogram 800b after 2,500 additional data points with fading applied, respectively, in accordance with an illustrative embodiment. The 2,500 additional data points added to data 124 again was generated from two different normal distributions with the mean value of 40 and the standard deviation of two. Sixth histogram 800b shows the recently observed data with a much higher relevance in comparison to fifth histogram 800a that applies the same relevance to each observed data point.

Figure 9:
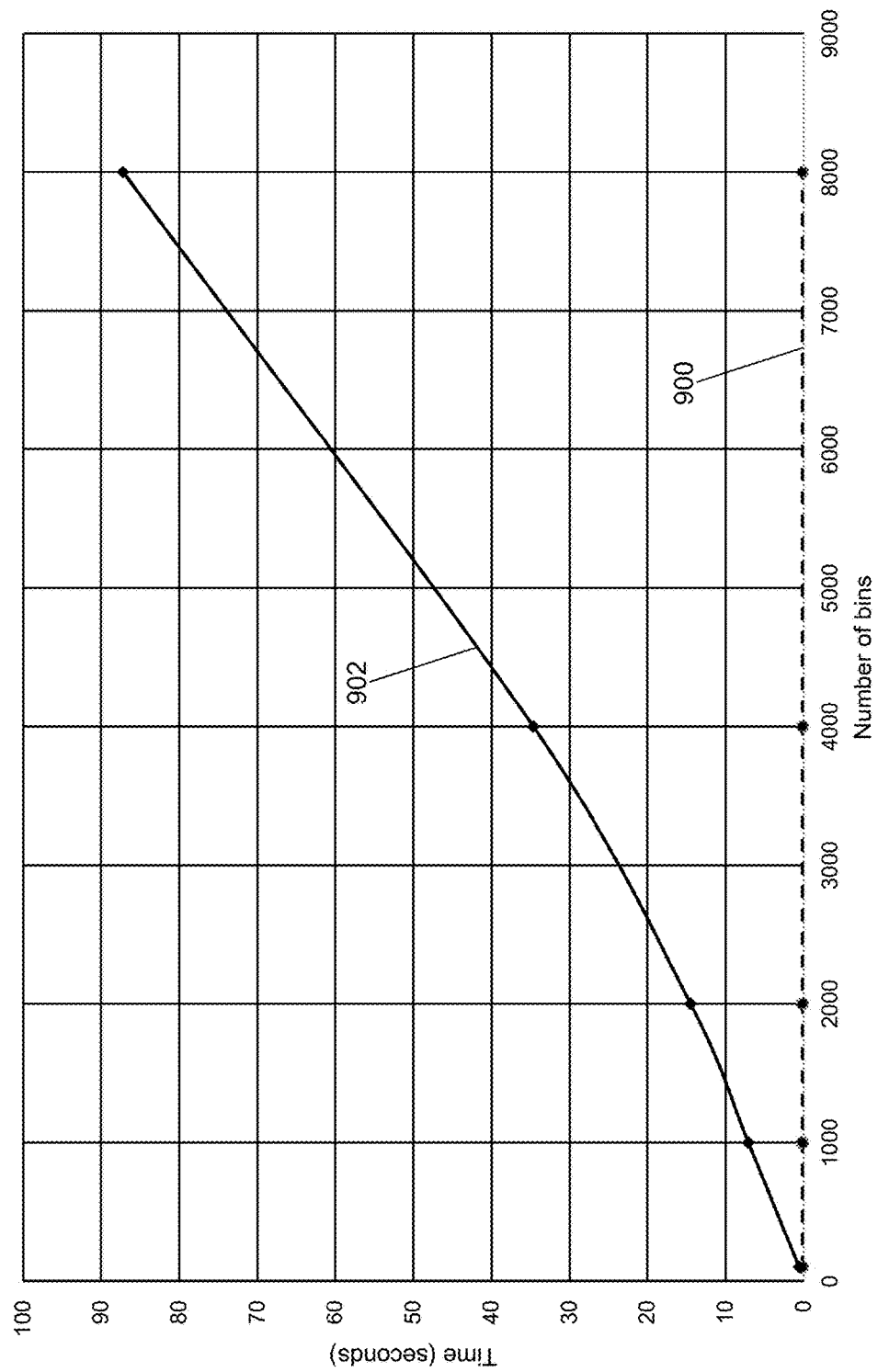
FIG. 9 shows a comparison in computation time as a function of the number of bins of a histogram between a previous algorithm and the present algorithm using low cardinality data in accordance with an illustrative embodiment.

Referring to FIG. 9, a comparison in computation time as a function of the number of bins of a histogram between a previous algorithm and the present algorithm using low cardinality data is shown in accordance with an illustrative embodiment. The previous algorithm was implemented using a single array with sorting after insertion of each data point into the histogram. A first computation time curve 900 shows a computation time as a function of the number of bins using the algorithm described by FIGS. 2A, 2B, and 2C without fading (the operations of FIG. 2D were not performed) and using AVL trees to store bin data 128 and distance data 126. A second computation time curve 902 shows a computation time as a function of the number of bins using the previous algorithm. Second computation time curve 902 shows an exponential increase in computation time as the number of bins increases; whereas, first computation time curve 900 shows essentially no increase in computation time as the number of bins increases. The computation time using the algorithm described by FIGS. 2A, 2B, and 2C without fading is always smaller than that using the previous algorithm.

Figure 10:
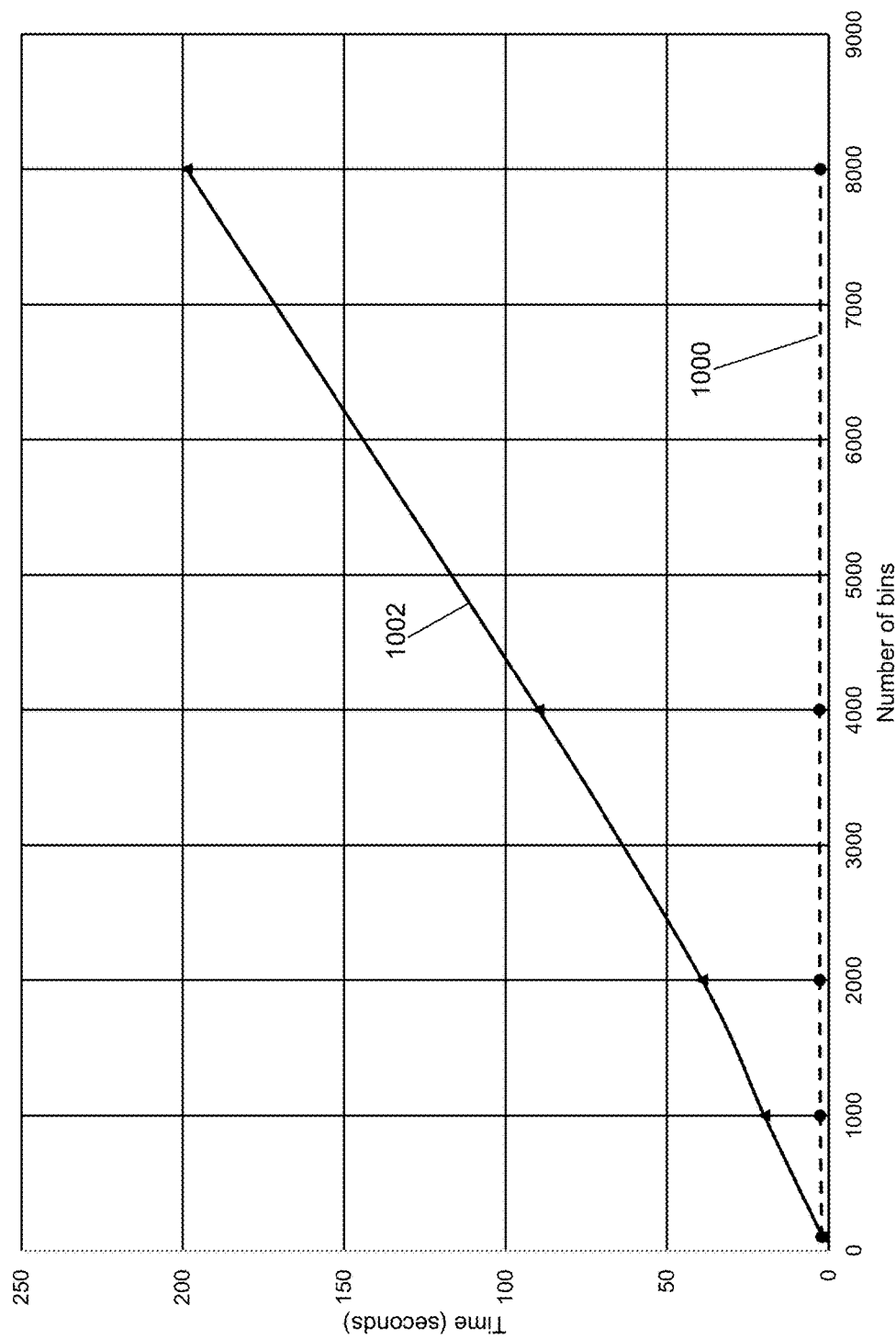
FIG. 10 shows a comparison in computation time as a function of the number of bins of a histogram between a previous algorithm and the present algorithm using high cardinality data in accordance with an illustrative embodiment.

Referring to FIG. 10, a comparison in computation time as a function of the number of bins of a histogram between a previous algorithm and the present algorithm using high cardinality data is shown in accordance with an illustrative embodiment. A third computation time curve 1000 shows a computation time as a function of the number of bins using the algorithm described by FIGS. 2A, 2B, and 2C without fading (the operations of FIG. 2D were not performed) and using AVL trees to store bin data 128 and distance data 126. A fourth computation time curve 1002 shows a computation time as a function of the number of bins using the previous algorithm.

Data 124 was a UCI Adult Data Set with a first feature, Age, shown in FIG. 9, and a second feature, Weight, shown in FIG. 10. The unique values for the feature Age is small (<85 unique values), but the number of unique values for the feature Weight is very large meaning that if there are more bins than unique values for the histogram, no merging is required, whereas, if the number of bins in the histogram is smaller than the number of unique values in the data, merging is required. This UCI Adult Data Set included 32,560 entries, and both features were integer values. For the first feature Age shown in FIG. 9, which required no merging, the previous algorithm is much slower than the present algorithm even for a small number of bins such as 1000. For the second feature Weight shown in FIG. 10, which required merging, the previous algorithm is even slower than the present algorithm even for a small number of bins such as 1000.

Figure 11:
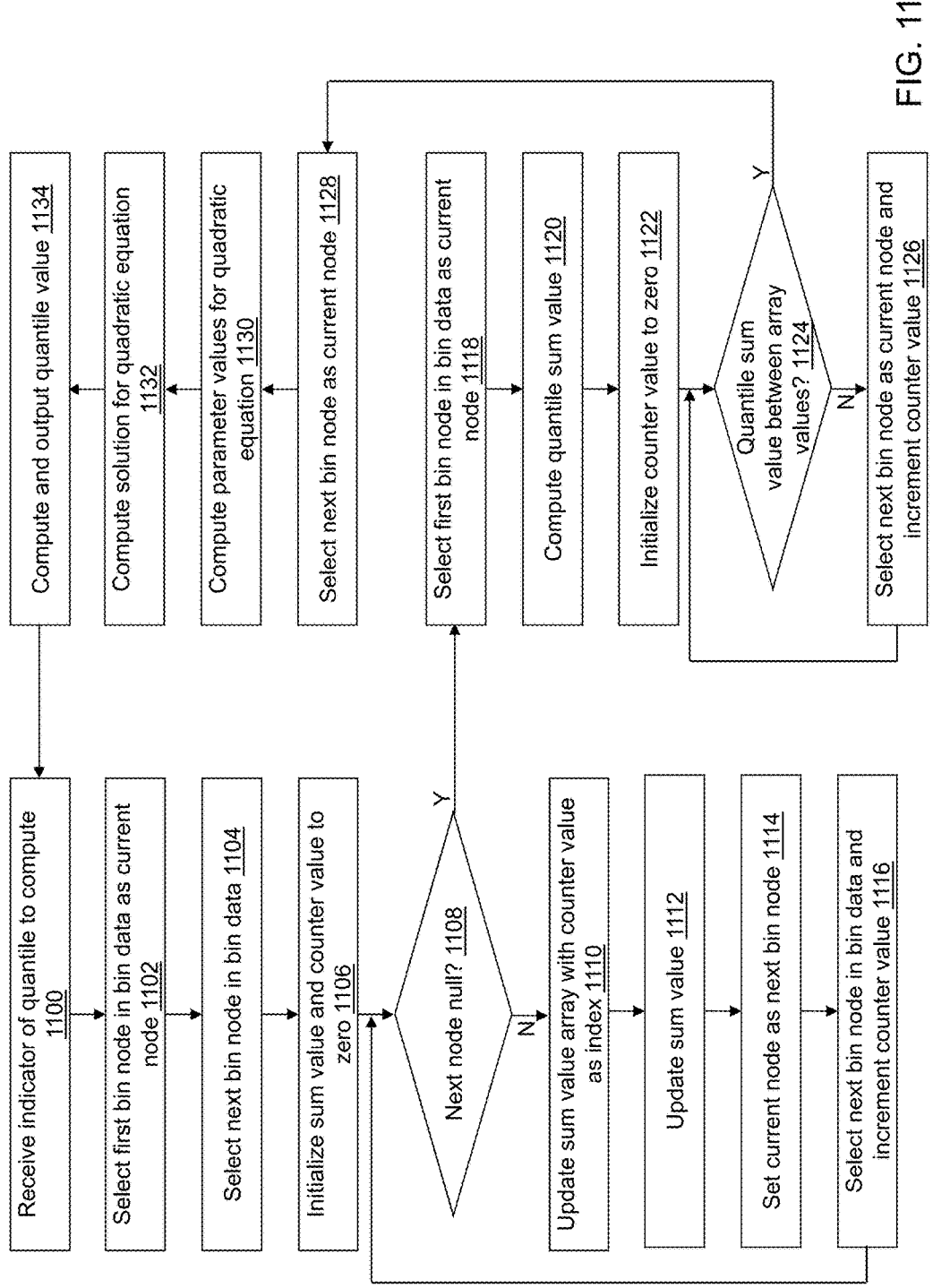
FIG. 11 depicts a flow diagram illustrating examples of operations performed by the histogram update device of FIG. 1 to compute a quantile value in accordance with an illustrative embodiment.

Referring to FIG. 11, example operations associated with histogram update application 122 in computing a quantile value are described. Additional, fewer, or different operations may be performed depending on the embodiment of histogram update application 122. The order of presentation of the operations of FIG. 11 is not intended to be limiting. Although some of the operational flows are presented in sequence, the various operations may be performed in various repetitions, concurrently (in parallel, for example, using threads and/or distributed computing system 128), and/or in other orders than those that are illustrated.

In an operation 1100, a fourth indicator may be received that indicates a quantile q to compute. For example, a user may interact with a user interface to select or enter the quantile q, where 0<q<1. In an alternative embodiment, the fourth indicator may not be received. For example, a default value may be stored, for example, in computer-readable medium 108 and used automatically. For illustration, a median value may be computed automatically with q=0.5.

In an operation 1102, a first bin node pointer $P_{bn\text{-}first}$ is selected from bin data 128 as a current bin node pointer $P_{bn\text{-}cur}$. Because bin data 128 is sorted, bin value $k_b$ of $P_{bn\text{-}first}$ has a smallest value of all of the bin nodes of bin data 128.

In an operation 1104, a next bin node $P_{bn\text{-}next}$ relative to first bin node pointer $P_{bn\text{-}first}$ is selected from bin data 128.

In an operation 1106, a sum value s and a counter value i are initialized to zero.

In an operation 1108, a determination is made concerning whether or not $P_{bn\text{-}next}$ is Null. When $P_{bn\text{-}next}$ is Null, processing continues in an operation 1118. When $P_{bn\text{-}next}$ is not Null, processing continues in an operation 1110.

In operation 1110, a sum value array is updated. For example, sum[i]=s+($f_{bc}$/2), where $f_{bc}$ is $f_b$ of the current bin node pointer $P_{bn\text{-}cur}$.

In an operation 1112, the sum values is updated based on s=s+$f_{bc}$.

In an operation 1114, the current bin node pointer $P_{bn\text{-}cur}$ is set as the next bin node $P_{bn\text{-}next}$.

In an operation 1116, the next bin node $P_{bn\text{-}next}$ is set as a next bin node relative to current bin node pointer $P_{bn\text{-}cur}$, the counter value i is incremented as i=i+1, and processing continues in operation 1108 until each bin node of bin data 128 is processed.

In operation 1118, the first bin node pointer $P_{bn\text{-}first}$ is selected from bin data 128 as a current bin node pointer $P_{bn\text{-}cur}$.

In an operation 1120, a quantile sum value is computed using $s_q = s*q$.

In an operation 1122, the counter value i is initialized to zero.

In an operation 1124, a determination is made concerning whether or not $\text{sum}[i] < s_q$ and $s_q \leq \text{sum}[i+1]$. When $\text{sum}[i] \leq s_q$ and $s_q < \text{sum}[i+1]$, processing continues in an operation 1128. When $\text{sum}[i] < s_q$, processing continues in an operation 1126.

In operation 1126, the current bin node pointer $P_{bn\text{-}cur}$ is set as the next bin node $P_{bn\text{-}next}$, the counter value i is incremented as i=i+1, and processing continues in operation 1124 until the bin node that contains the quantile sum value $s_q$ is located.

In operation 1128, the next bin node pointer $P_{bn\text{-}next}$ relative to the current bin node pointer $P_{bn\text{-}cur}$ is selected.

In an operation 1130, quadratic equation parameters a, b, and c, are computed where $a = (f_{bn} - f_{bc})$, where $f_{bn}$ is $f_b$ of the next bin node pointer $P_{bn\text{-}next}$, and $f_{bc}$ is $f_b$ of the current bin node pointer $P_{bn\text{-}cur}$, $b = 2*f_{bc}$, and $c = -2*(s_q - \text{sum}[i])$.

In an operation 1132, a solution z of the quadratic equation is computed using $$z = (-b + \sqrt{b^2 - 4ac})/2a.$$

In an operation 1134, the quantile value $q_v$ is computed using $q_v = k_{bc} + (k_{bn} - k_{bc})*z$, where $k_{bn}$ is $k_b$ of the next bin node pointer $P_{bn\text{-}next}$, and $k_{bc}$ is $k_b$ of the current bin node pointer $P_{bn\text{-}cur}$. The quantile value $q_v$ is output, and processing continues in operation 1100 to wait for another quantile q to compute or processing stops. For example, the quantile value $q_v$ may be output by storing the quantile value $q_v$ to computer-readable medium 108 or another computer-readable medium of distributed computing system 128. In addition, or in the alternative, the quantile value $q_v$ may be presented on display 116, printed on printer 120, sent to another computing device using communication interface 106, an alarm or other alert signal may be sounded through speaker 118, for example, when a threshold is exceeded, etc.

To summarize the operation of FIG. 11, an estimate of a quantile is computed based on the "Uniform" algorithm described in Yael Ben-Haim and Elad Tom-Tov, *A Streaming Parallel Decision Tree Algorithm*, 11 The Journal of Machine Learning Research 849-72 (2010). Other methods may be used to estimate the quantile. However, no "Sum" function is needed based on use of distance data 126 and bin data 128, which makes the quantile computation much faster. An array is created that stores the sum of all of the bins to the left of the current position in the array. The quantile sum value is computed and the two bin nodes whose bin values surround the quantile sum value are identified. The solution to the quadratic equation is computed and used to calculate the resulting estimation of the quantile value $q_v$.

Figure 12:
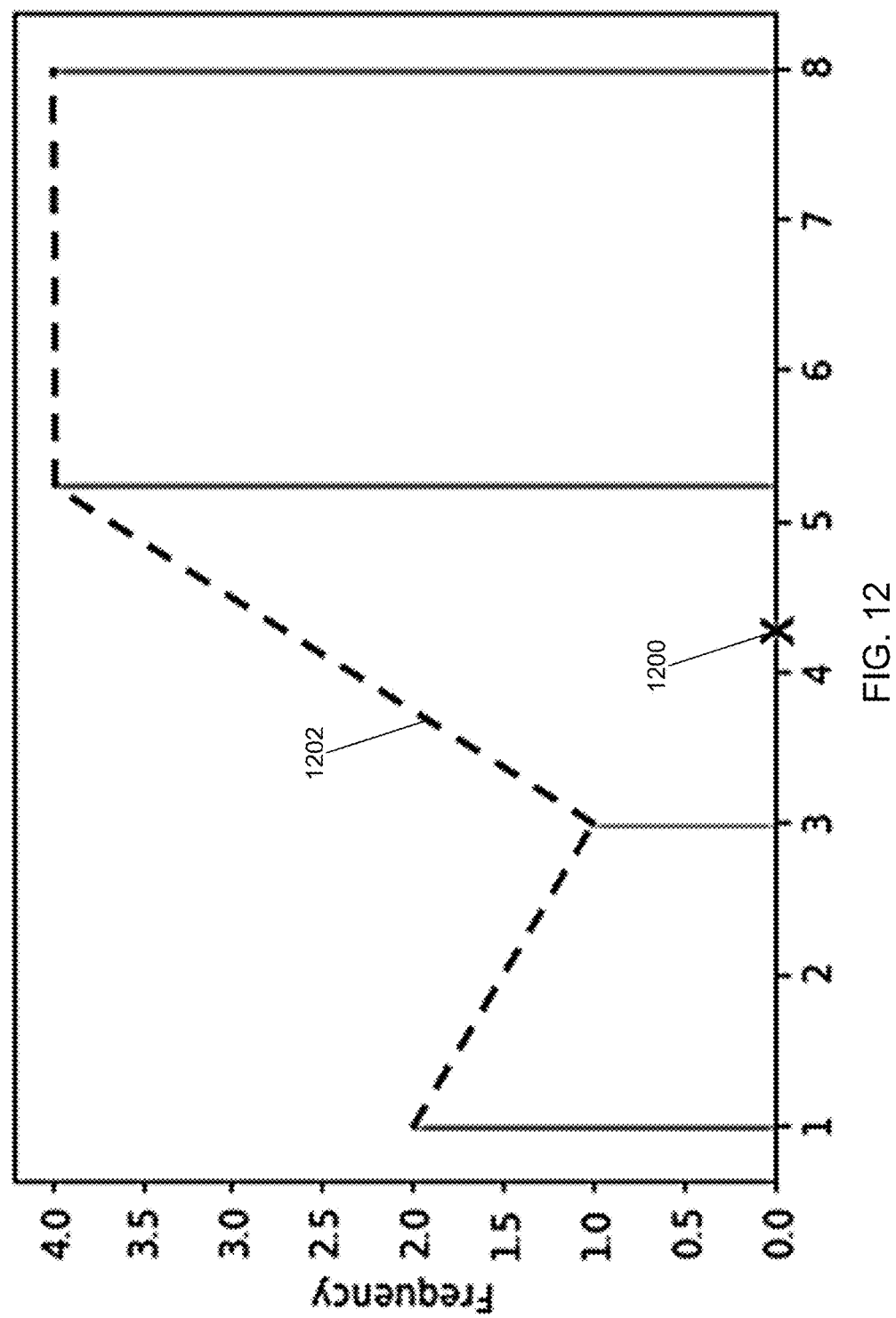
FIG. 12 illustrates use of lines between bins to estimate the quantile value for a quantile 0.5 in accordance with an illustrative embodiment.

Referring to FIG. 12, the process of computing the quantile value $q_v$ is illustrated for a quantile 0.5 in accordance with an illustrative embodiment. The quantile value $q_v = 4.23$ (indicated by an "x" indicator 1200) was computed for the histogram illustrated. z is computed to find an area of a trapezoid defined by 1202 and bounded by i=2 ($k_b = 3$) and i=3 ($k_b = 5.25$).

Figure 13:
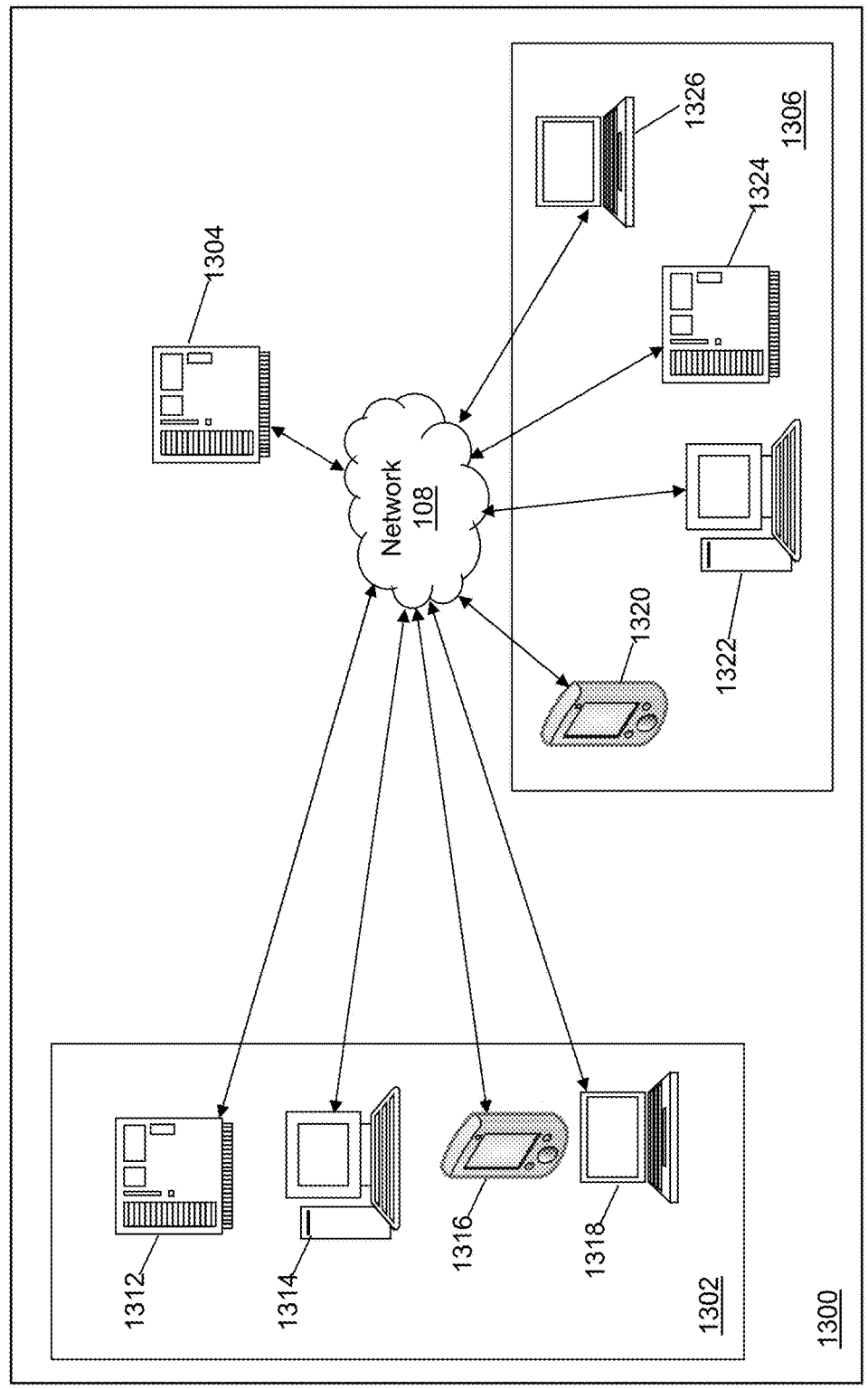
FIG. 13 depicts a block diagram of a stream processing system that includes the histogram update device of FIG. 1 in accordance with an illustrative embodiment.

Referring to FIG. 13, a block diagram of a stream processing system 1300 is shown in accordance with an illustrative embodiment. In an illustrative embodiment, stream processing system 1300 may include an event publishing system 1302, an ESP device 1304, an event subscribing system 1306, and a network 108. Each of event publishing system 1302, ESP device 1304 and event subscribing system 1306 may be composed of one or more discrete devices in communication through network 108.

Event publishing system 1302 includes, is integrated with, and/or communicates with one or more sensors 1613 (shown referring to FIG. 16), data generation devices, data capture devices, etc. For example, sensor 1613 may produce a sensor signal value referred to as a measurement data value representative of a measure of a physical quantity in an environment to which sensor 1613 is associated and generate a corresponding measurement datum that typically is associated with a time that the measurement datum is generated. The environment to which sensor 1613 is associated for monitoring may include a power grid system, a telecommunications system, a fluid (oil, gas, water, etc.) pipeline, a transportation system, an industrial device, a medical device, an appliance, a vehicle, a computing device, etc. Example sensor types include a pressure sensor, a temperature sensor, a position or location sensor, a velocity sensor, an acceleration sensor, a fluid flow rate sensor, a voltage sensor, a current sensor, a frequency sensor, a phase angle sensor, a data rate sensor, a humidity sensor, an acoustic sensor, a light sensor, a motion sensor, an electromagnetic field sensor, a force sensor, a torque sensor, a load sensor, a strain sensor, a chemical property sensor, a resistance sensor, a radiation sensor, an irradiance sensor, a proximity sensor, a distance sensor, a vibration sensor, etc. that may be mounted to various components used as part of the system. As another example, a data generation device may be a computing device that generates a measurement data value in response to occurrence of an event. As still another example, a data capture device may be a computing device that receives a measurement data value generated by another device that may be in response to an event.

Event publishing system 1302 publishes the measurement data value to ESP device 1304 as an "event". An event is a data record that reflects something that has happened and is a data record. An event object is stored using a predefined format that includes fields and keys. For illustration, a first field and a second field may represent an operation code (opcode) and a flag. The opcode enables update, upsert, insert, and delete of an event object. The flag indicates whether the measurement data value and/or other field data has all of the fields filled or only updated fields in the case of an "Update" opcode. An upsert opcode updates the event object if a key field already exists; otherwise, the event object is inserted. ESP device 1304 receives the measurement data value in an event stream, processes the measurement data value, and identifies a computing device of event subscribing system 1306 to which the processed measurement data value is sent.

Network 108 may include one or more networks of the same or different types. Network 108 can be any type of wired and/or wireless public or private network including a cellular network, a local area network, a wide area network such as the Internet or the World Wide Web, etc. Network 108 further may comprise sub-networks and consist of any number of communication devices.

The one or more computing devices of event publishing system 1302 may include computing devices of any form factor such as a server computer 1312, a desktop 1314, a smart phone 1316, a laptop 1318, a personal digital assistant, an integrated messaging device, a tablet computer, a point of sale system, a transaction system, etc. Event publishing system 1302 can include any number and any combination of form factors of computing devices that may be organized into subnets. The computing devices of event publishing system 1302 send and receive signals through network 108 to/from another of the one or more computing devices of event publishing system 1302 and/or to/from ESP device 1304. The one or more computing devices of event publishing system 1302 may communicate using various transmission media that may be wired and/or wireless as understood by those skilled in the art. The one or more computing devices of event publishing system 1302 may be geographically dispersed from each other and/or co-located. Each computing device of the one or more computing devices of event publishing system 1302 may be executing one or more event publishing applications such as an event publishing application 1622 (shown referring to FIG. 16) of the same or different type.

ESP device 1304 can include any form factor of computing device. For illustration, FIG. 13 represents ESP device 1304 as a server computer. In general, a server computer may include faster processors, additional processors, more disk memory, and/or more random access memory (RAM) than a client computer and support multi-threading as understood by a person of skill in the art. ESP device 1304 sends and receives signals through network 108 to/from event publishing system 1302 and/or to/from event subscribing system 1306. ESP device 1304 may communicate using various transmission media that may be wired and/or wireless as understood by those skilled in the art. ESP device 1304 may be implemented on a plurality of computing devices of the same or different type that support failover processing.

The one or more computing devices of event subscribing system 1306 may include computers of any form factor such as a smart phone 1320, a desktop 1322, a server computer 1324, a laptop 1326, a personal digital assistant, an integrated messaging device, a tablet computer, etc. Event subscribing system 1306 can include any number and any combination of form factors of computing devices. The computing devices of event subscribing system 1306 send and receive signals through network 108 to/from ESP device 1304. The one or more computing devices of event subscribing system 1306 may be geographically dispersed from each other and/or co-located. The one or more computing devices of event subscribing system 1306 may communicate using various transmission media that may be wired and/or wireless as understood by those skilled in the art. Each computing device of the one or more computing devices of event subscribing system 102 may be executing one or more event subscribing applications such as an event subscribing application 1822 (shown referring to FIG. 18) of the same or different type.

Figure 14:
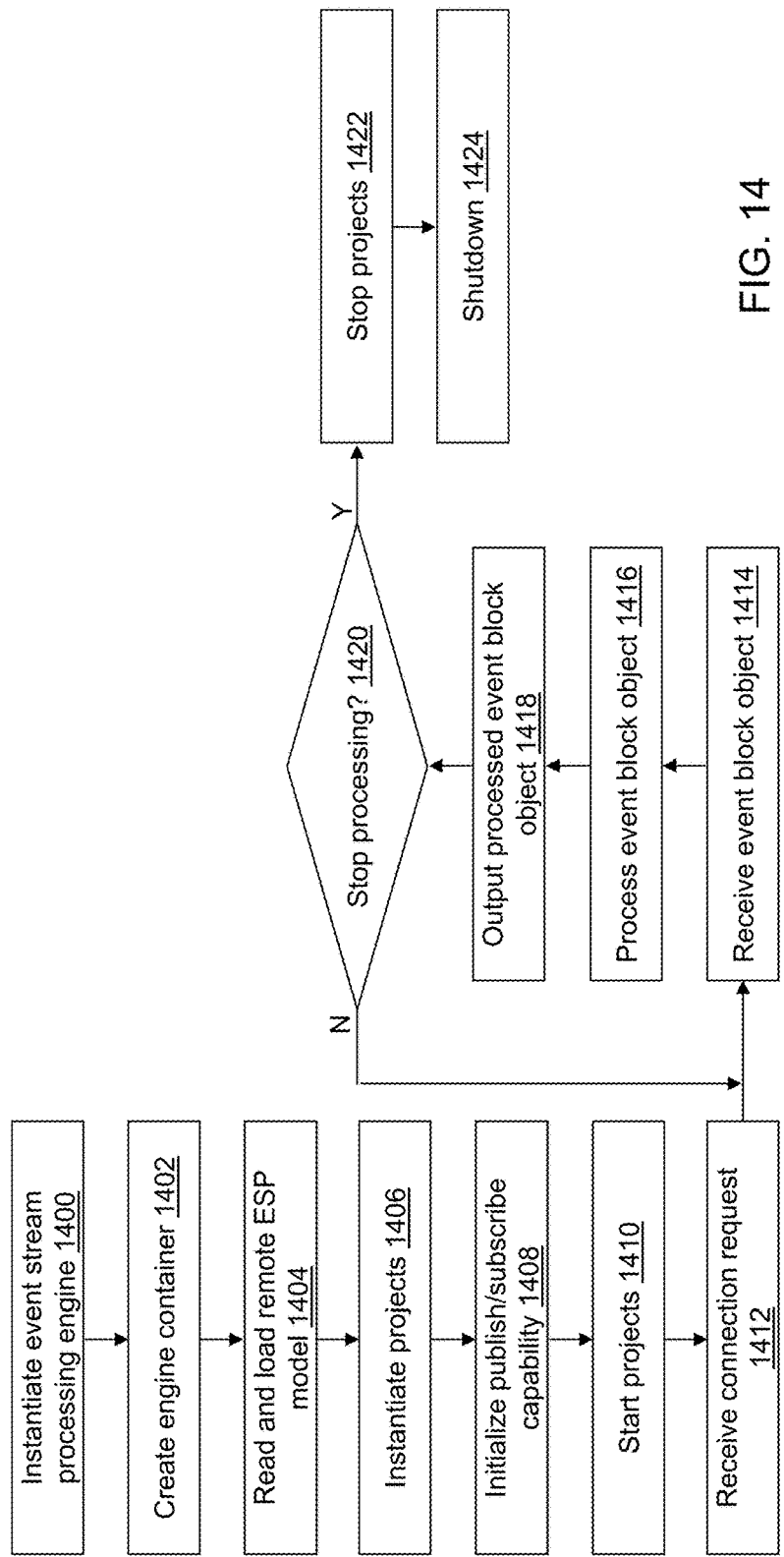
FIG. 14 depicts a flow diagram illustrating examples of operations performed by an event stream processing (ESP) device of FIG. 13 in accordance with an illustrative embodiment.

Referring to FIG. 14, a flow diagram illustrating examples of operations performed by ESP device 1304 is shown in accordance with an illustrative embodiment. Additional, fewer, or different operations may be performed depending on the embodiment of histogram update application 122. The order of presentation of the operations of FIG. 14 is not intended to be limiting. Although some of the operational flows are presented in sequence, the various operations may be performed in various repetitions, concurrently (in parallel, for example, using threads and/or distributed computing system 128), and/or in other orders than those that are illustrated. In an illustrative embodiment, ESP device 1304 is also configured to perform the operations of FIGS. 2A, 2B, 2C, 2D, and/or 11. For example, in operation 208 shown referring to FIG. 2A, the data point value p and the weight value w are received from event publishing device 1600. In operation 230 shown referring to FIG. 2A, bin data 128 may be output to event subscribing device 1800. In operation 1134 shown referring to FIG. 11, the quantile value $q_v$ may be output to event subscribing device 1800.

Figure 15:
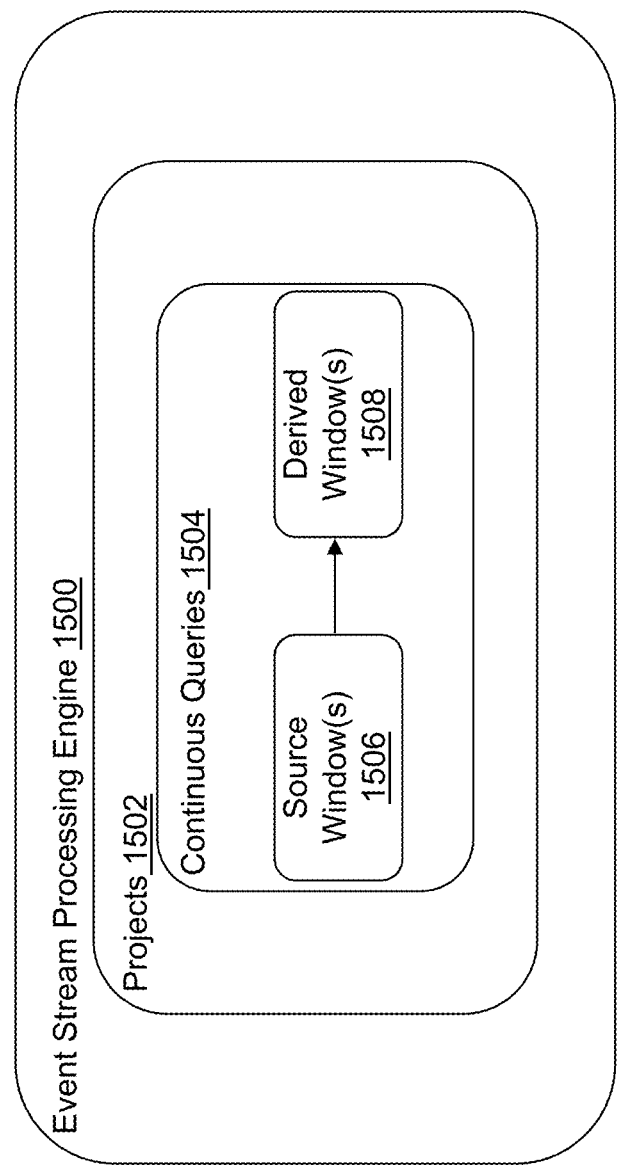
FIG. 15 depicts a block diagram of an ESP engine executing on the ESP device of FIG. 14 in accordance with an illustrative embodiment.

In an operation 1400, an ESP engine (ESPE) 1500 (shown referring to FIG. 15) is instantiated. For example, referring to FIG. 15, the components of ESPE 1500 executing at ESP device 1304 are shown in accordance with an illustrative embodiment. ESPE 1500 may include one or more projects 1502. A project may be described as a second-level container in an engine model managed by ESPE 1500 where a thread pool size for the project may be defined by a user. A value of one for the thread pool size indicates that writes are single-threaded. Each project of the one or more projects 1502 may include one or more continuous queries 1504 that contain data flows, which are data transformations of incoming event streams. The one or more continuous queries 1504 may include one or more source windows 1506 and one or more derived windows 1508.

The engine container is the top-level container in a model that manages the resources of the one or more projects 1502. Each ESPE 1500 has a unique engine name. Additionally, the one or more projects 1502 may each have unique project names, and each query may have a unique continuous query name and begin with a uniquely named source window of the one or more source windows 1506. Each ESPE 1500 may or may not be persistent.

Continuous query modeling involves defining directed graphs of windows for event stream manipulation and transformation. A window in the context of event stream manipulation and transformation is a processing node in an event stream processing model. A window in a continuous query can perform aggregations, computations, pattern-matching, and other operations on data flowing through the window. A continuous query may be described as a directed graph of source, relational, pattern matching, and procedural windows. The one or more source windows 1506 and the one or more derived windows 1508 represent continuously executing queries that generate updates to a query result set as new event blocks stream through ESPE 1500. A directed graph, for example, is a set of nodes connected by edges, where the edges have a direction associated with them.

An event object may be described as a packet of data accessible as a collection of fields, with at least one of the fields defined as a key or unique identifier (ID). The event object may be an individual record of an event stream. The event object may be created using a variety of formats including binary, alphanumeric, XML, etc. Each event object may include one or more fields designated as a primary ID for the event so ESPE 1500 can support the opcodes for events including insert, update, upsert, and delete. As a result, events entering a source window of the one or more source windows 1506 may be indicated as insert (I), update (U), delete (D), or upsert (P).

For illustration, an event object may be a packed binary representation of one or more sensor measurements and may include both metadata and measurement data associated with a timestamp value. The metadata may include the opcode indicating if the event represents an insert, update, delete, or upsert, a set of flags indicating if the event is a normal, partial-update, or a retention generated event from retention policy management, and one or more microsecond timestamps. For example, the one or more microsecond timestamps may indicate a sensor data generation time, a data receipt time by event publishing device 1600, a data transmit time by event publishing device 1600, a data receipt time by ESP device 1304, etc.

An event block object may be described as a grouping or package of one or more event objects. An event stream may be described as a flow of event block objects. A continuous query of the one or more continuous queries 1504 transforms the incoming event stream made up of streaming event block objects published into ESPE 1500 into one or more outgoing event streams using the one or more source windows 1506 and the one or more derived windows 1508. A continuous query can also be thought of as data flow modeling.

The one or more source windows 1506 are at the top of the directed graph and have no windows feeding into them. Event streams are published into the one or more source windows 1506, and from there, the event streams are directed to the next set of connected windows as defined by the directed graph. The one or more derived windows 1508 are all instantiated windows that are not source windows and that have other windows streaming events into them. The one or more derived windows 1508 perform computations or transformations on the incoming event streams. The one or more derived windows 1508 transform event streams based on the window type (that is operators such as join, filter, compute, aggregate, copy, pattern match, procedural, union, etc.) and window settings. As event streams are published into ESPE 1500, they are continuously queried, and the resulting sets of derived windows in these queries are continuously updated.

Referring again to FIG. 14, in an operation 1402, the engine container is created. For illustration, ESPE 1500 may be instantiated using a function call that specifies the engine container as a manager for the model. The function call may include the engine name for ESPE 1500 that may be unique to ESPE 1500.

In an operation 1404, an ESP model that may be stored locally to computer-readable medium 108 is read and loaded.

In an operation 1406, the one or more projects 402 defined by the ESP model are instantiated. Instantiating the one or more projects 1502 also instantiates the one or more continuous queries 1504, the one or more source windows 1506, and the one or more derived windows 1508 defined from the ESP model. Based on the ESP model, ESPE 1500 may analyze and process events in motion or event streams. Instead of storing events and running queries against the stored events, ESPE 1500 may store queries and stream events through them to allow continuous analysis of data as it is received. The one or more source windows 1506 and the one or more derived windows 1508 defined from the ESP model may be created based on the relational, pattern matching, and procedural algorithms that transform the input event streams into the output event streams to model, simulate, score, test, predict, etc. based on the continuous query model defined by the ESP model and event publishing application 1622 that is streaming data to ESPE 1500.

In an operation 1408, the pub/sub capability is initialized for ESPE 1500. In an illustrative embodiment, the pub/sub capability is initialized for each project of the one or more projects 1502. To initialize and enable pub/sub capability for ESPE 1500, a host name and a port number are provided. The host name and the port number of may be read from the ESP model. Pub/sub clients can use a host name and the port number of ESP device 1304 to establish pub/sub connections to ESPE 1500. For example, a server listener socket is opened for the port number to enable event subscribing system 108 to connect to ESPE 1500 for pub/sub services.

The host name and the port number of ESP device 1304 to establish pub/sub connections to ESPE 1500 may be referred to as the host:port designation of ESPE 1500 executing on ESP device 1304.

In an operation 1410, the one or more projects 1502 defined from the ESP model are started. The one or more started projects may run in the background on ESP device 1304.

In an operation 1412, a connection request is received from event publishing device 1600 for a source window to which data will be published. A connection request further is received from a computing device of event subscribing system 108, for example, from event subscribing device 1700.

In an operation 1414, an event block object is received from event publishing device 1600. An event block object containing one or more event objects is injected into a source window of the one or more source windows 1506 defined from the ESP model.

In an operation 1416, the received event block object is processed through the one or more continuous queries 1504. The unique ID assigned to the event block object by event publishing device 1600 is maintained as the event block object is passed through ESPE 1500 and between the one or more source windows 1506 and/or the one or more derived windows 1508 of ESPE 1500. A unique embedded transaction ID further may be embedded in the event block object as the event block object is processed by a continuous query. ESPE 1500 maintains the event block containership aspect of the received event blocks from when the event block is published into a source window and works its way through the directed graph defined by the one or more continuous queries 1504 with the various event translations before being output to event subscribing device 1700.

For illustration, the operations of FIGS. 2A, 2B, 2C, 2D, and/or 11 are made available in a calculate window in of ESPE 1500. The calculate window receives data from the source window, and creates a streaming histogram. Each time a new event block object is received into the calculate window containing the streaming histogram, the appropriate data within the received event block object is extracted and the streaming histogram is updated to include the extracted data. An output from the calculate window may be bin data 128 as described in operation 230. If the user has requested calculation of a quantile, the output may be the quantile value $q_v$ as described in operation 1134.

In an operation 1418, the processed event block object is output to one or more subscribing devices of event subscribing system 108 such as event subscribing device 1700. Subscribing devices can correlate a group of subscribed event block objects back to a group of published event block objects by comparing the unique ID of the event block object that a publisher, such as event publishing device 1600, attached to the event block object with the event block ID received by event subscribing device 1700. The received event block objects further may be stored, for example, in a RAM or cache type memory of computer-readable medium 108.

In an operation 1420, a determination is made concerning whether or not processing is stopped. If processing is not stopped, processing continues in operation 1414 to continue receiving the one or more event streams containing event block objects from event publishing device 1600. If processing is stopped, processing continues in an operation 1422.

In operation 1422, the started projects are stopped.

In an operation 1424, ESPE 1500 is shutdown.

Figure 16:
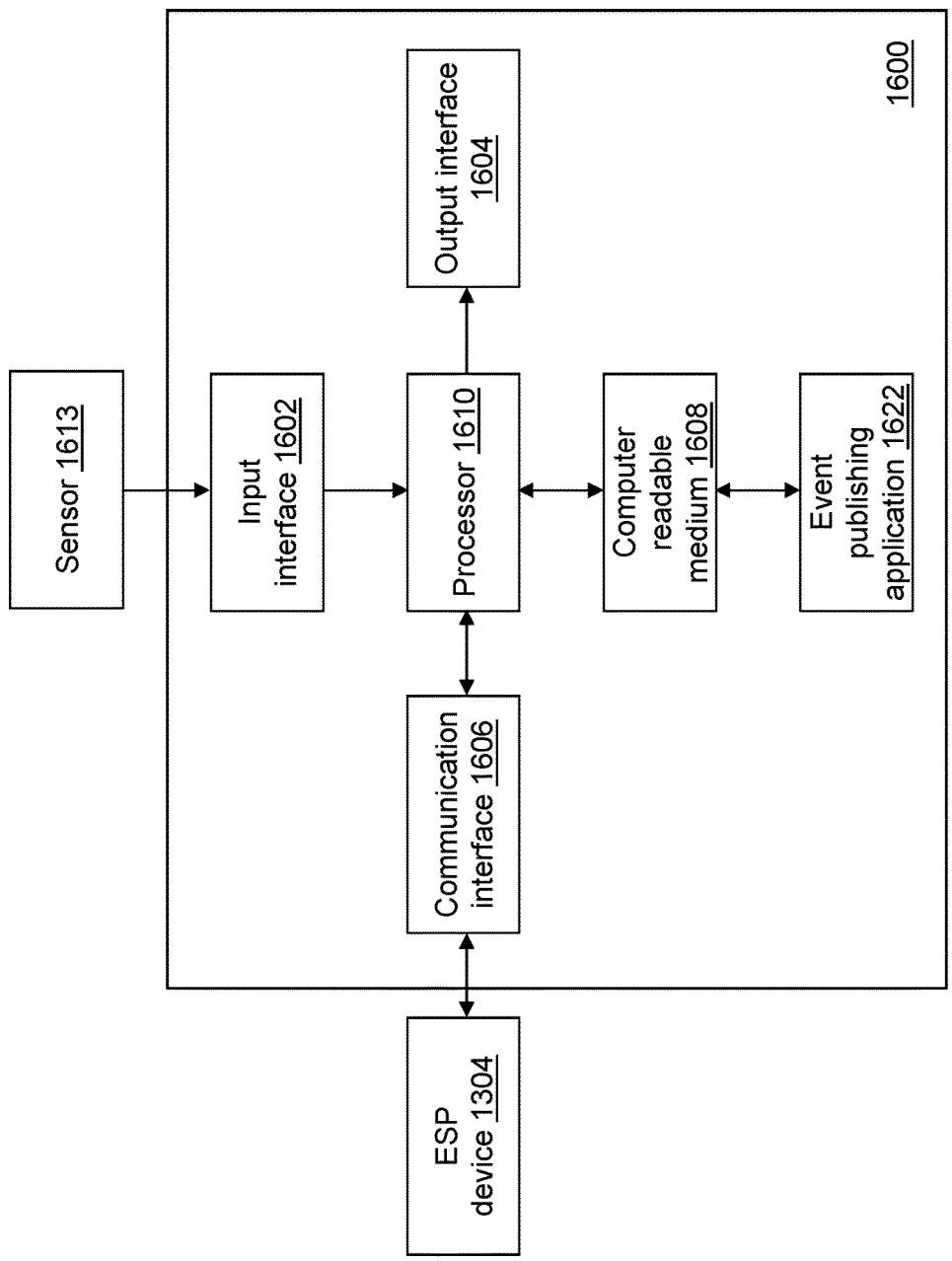
FIG. 16 depicts a block diagram of an event publishing device of an event publishing system of the stream processing system of FIG. 13 in accordance with an illustrative embodiment.

Referring to FIG. 16, a block diagram of an event publishing device 1600 of event publishing system 1302 is shown in accordance with an example embodiment. Event publishing device 1600 is an example computing device of event publishing system 1302. For example, each of server computer 1312, desktop 1314, smart phone 1316, and laptop 1318 may be an instance of event publishing device 1600. Event publishing device 1600 may include a second input interface 1602, a second output interface 1604, a second communication interface 1606, a second computer-readable medium 1608, a second processor 1610, and event publishing application 1622. Each event publishing device 1600 of event publishing system 1302 may include the same or different components and combinations of components. Fewer, different, and additional components may be incorporated into event publishing device 1600.

Second input interface 1602 provides the same or similar functionality as that described with reference to input interface 102 of histogram update device 100 though referring to event publishing device 1600. Second output interface 1604 provides the same or similar functionality as that described with reference to output interface 104 of histogram update device 100 though referring to event publishing device 1600. Second communication interface 1606 provides the same or similar functionality as that described with reference to communication interface 106 of histogram update device 100 though referring to event publishing device 1600. Data and messages may be transferred between event publishing device 1600 and ESP device 1304 using second communication interface 1606. Second computer-readable medium 1608 provides the same or similar functionality as that described with reference to computer-readable medium 108 of histogram update device 100 though referring to event publishing device 1600. Second processor 1610 provides the same or similar functionality as that described with reference to processor 110 of histogram update device 100 though referring to event publishing device 1600.

Event publishing application 1622 performs operations associated with generating, capturing, and/or receiving measurement data value and publishing the measurement data value in an event stream to one or more computing devices of event subscribing system 1306 directly or indirectly through ESP device 1304. The operations may be implemented using hardware, firmware, software, or any combination of these methods. Referring to the example embodiment of FIG. 16, event publishing application 1622 is implemented in software (comprised of computer-readable and/or computer-executable instructions) stored in second computer-readable medium 1608 and accessible by second processor 1610 for execution of the instructions that embody the operations of event publishing application 1622. Event publishing application 1622 may be written using one or more programming languages, assembly languages, scripting languages, etc. Event publishing application 1622 may be implemented as a Web application.

Figure 17:
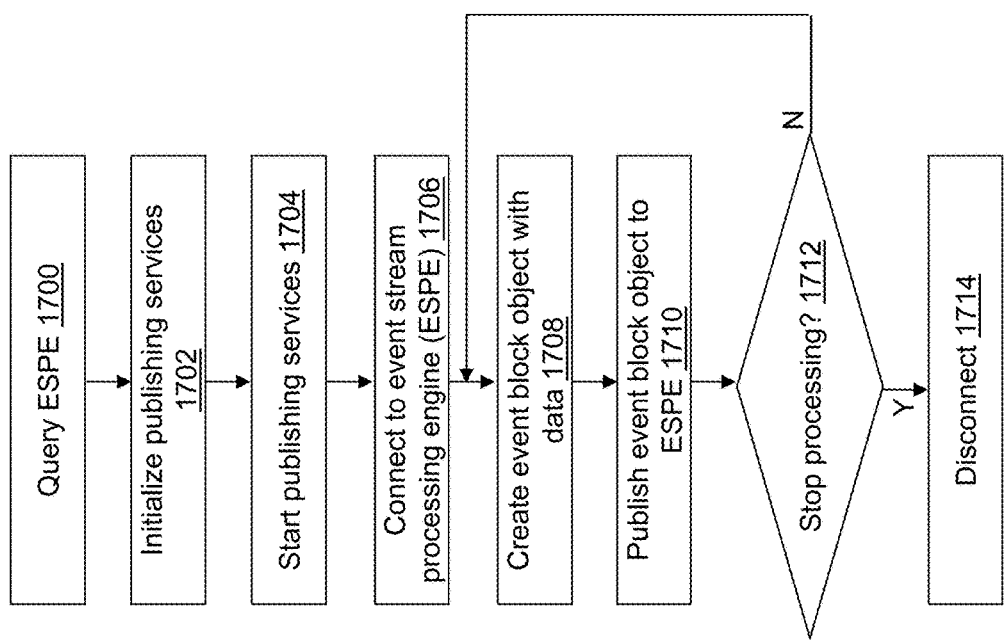
FIG. 17 depicts a flow diagram illustrating examples of operations performed by the event publishing device of FIG. 16 in accordance with an illustrative embodiment.

Referring to FIG. 17, example operations associated with event publishing application 1622 are described. Additional, fewer, or different operations may be performed depending on the embodiment. The order of presentation of the operations of FIG. 17 is not intended to be limiting. A user can interact with one or more user interface windows presented to the user in a display under control of event publishing application 1622 independently or through a browser application in an order selectable by the user. Although some of the operational flows are presented in sequence, the various operations may be performed in various repetitions, concurrently, and/or in other orders than those that are illustrated. For example, a user may execute event publishing application 1622, which causes presentation of a first user interface window, which may include a plurality of menus and selectors such as drop down menus, buttons, text boxes, hyperlinks, etc. associated with event publishing application 1622 as understood by a person of skill in the art. As further understood by a person of skill in the art, various operations may be performed in parallel, for example, using a plurality of threads or a plurality of computing devices such as a grid or a cloud of computing devices.

In an operation 1600, ESPE 1500 is queried, for example, to discover projects 1502, continuous queries 1504, windows 1506, 1508, window schema, and window edges currently running in ESPE 1500. The engine name and host/port to ESPE 1500 may be provided as an input to the query and a list of strings may be returned with the names of the projects 1502, of the continuous queries 1504, of the windows 1506, 1508, of the window schema, and/or of the window edges of currently running projects on ESPE 1500. The host is associated with a host name or Internet Protocol (IP) address of ESP device 1304. The port is the port number provided when a publish/subscribe (pub/sub) capability is initialized by ESPE 1500. The engine name is the name of ESPE 1500. The engine name of ESPE 1500 and host/port to ESP device 1304 may be read from a storage location on second computer-readable medium 1608, may be provided on a command line, or otherwise input to or defined by event publishing application 1622 as understood by a person of skill in the art.

In an operation 1702, publishing services are initialized.

In an operation 1704, the initialized publishing services are started, which may create a publishing client for the instantiated event publishing application 1622. The publishing client performs the various pub/sub activities for the instantiated event publishing application 1622. For example, a string representation of a URL to ESPE 1500 is passed to a "Start" function. For example, the URL may include the host:port designation of ESPE 1500 executing at ESP device 1304, a project of the projects 1502, a continuous query of the continuous queries 1504, and a window of the source windows 1506. The "Start" function may validate and retain the connection parameters for a specific publishing client connection and return a pointer to the publishing client. For illustration, the URL may be formatted as "dfESP://<host>:<port>/<project name>/<continuous query name>/<source window name>". If event publishing application 1622 is publishing to more than one source window of ESPE 1500, the initialized publishing services may be started to each source window using the associated names (project name, continuous query name, source window name).

Pub/sub is a message-oriented interaction paradigm based on indirect addressing. Processed data recipients (event subscribing system 1306) specify their interest in receiving information from ESPE 1500 by subscribing to specific classes of events, while information sources (event publishing system 1302) publish events to ESPE 1500 without directly addressing the data recipients.

In an operation 1706, a connection is made between event publishing application 1622 and ESPE 1500 for each source window of the source windows 1506 to which any measurement data value is published. To make the connection, the pointer to the created publishing client may be passed to a "Connect" function. If event publishing application 1622 is publishing to more than one source window of ESPE 1500, a connection may be made to each started window using the pointer returned for the respective "Start" function call.

In an operation 1708, an event block object is created by event publishing application 1622 that includes a measurement data value. The measurement data value may have been received, captured, generated, etc., for example, through second communication interface 1606 or second input interface 1602 or by second processor 1610. The measurement data value may be processed before inclusion in the event block object, for example, to change a unit of measure, convert to a different reference system, etc. The event block object may include a plurality of measurement data values measured at different times and/or by different devices.

In an operation 1710, the created event block object is published to ESPE 1500, for example, using the pointer returned for the respective "Start" function call to the appropriate source window. Event publishing application 1622 passes the created event block object to the created publishing client, where the unique ID field in the event block object has been set by event publishing application 1622 possibly after being requested from the created publishing client. In an illustrative embodiment, event publishing application 1622 may wait to begin publishing until a "Ready" callback has been received from the created publishing client. The event block object is injected into the source window, continuous query, and project associated with the started publishing client.

In an operation 1712, a determination is made concerning whether or not processing is stopped. If processing is not stopped, processing continues in operation 1708 to continue creating and publishing event block objects that include measurement data values. If processing is stopped, processing continues in an operation 1714.

In operation 1714, the connection made between event publishing application 1622 and ESPE 1500 through the created publishing client is disconnected, and each started publishing client is stopped.

Figure 18:
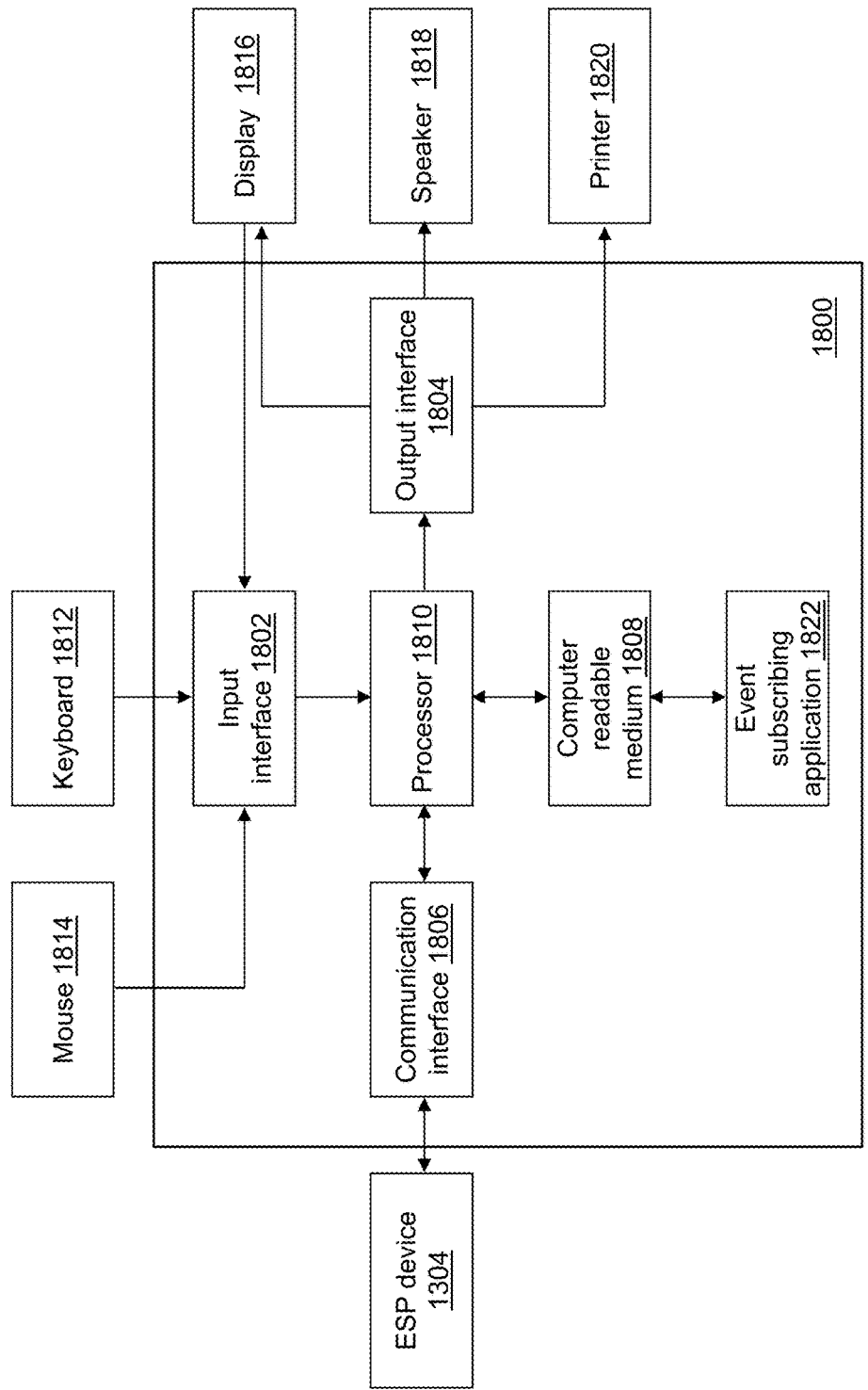
FIG. 18 depicts a block diagram of an event subscribing device of an event subscribing system of the stream processing system of FIG. 13 in accordance with an illustrative embodiment.

Referring to FIG. 18, a block diagram of an event subscribing device 1800 is shown in accordance with an example embodiment. Event subscribing device 1800 is an example computing device of event subscribing system 1306. For example, each of smart phone 1320, desktop 1322, server computer 1324, and laptop 1326 may be an instance of event subscribing device 1800. Event subscribing device 1800 may include a third input interface 1802, a third output interface 1804, a third communication interface 1806, a third computer-readable medium 1808, a third processor 1810, and an event subscribing application 1822. Fewer, different, and additional components may be incorporated into event subscribing device 1800. Each event subscribing device 1800 of event subscribing system 1306 may include the same or different components or combination of components.

Third input interface 1802 provides the same or similar functionality as that described with reference to input interface 102 of histogram update device 100 though referring to event subscribing device 1800. Third output interface 1804 provides the same or similar functionality as that described with reference to output interface 104 of histogram update device 100 though referring to event subscribing device 1800. Third communication interface 1806 provides the same or similar functionality as that described with reference to communication interface 106 of histogram update device 100 though referring to event subscribing device 1800. Data and messages may be transferred between event subscribing device 1800 and ESP device 1304 using third communication interface 1806. Third computer-readable medium 1808 provides the same or similar functionality as that described with reference to computer-readable medium 108 of histogram update device 100 though referring to event subscribing device 1800. Third processor 1810 provides the same or similar functionality as that described with reference to processor 110 of histogram update device 100 though referring to event subscribing device 1800.

Referring to FIG. 19, example operations associated with event subscribing application 1822 are described. Additional, fewer, or different operations may be performed depending on the embodiment. The order of presentation of the operations of FIG. 19 is not intended to be limiting.

Similar to operation 1700, in an operation 1900, ESPE 1500 is queried, for example, to discover names of projects 1502, of continuous queries 1504, of windows 1506, 1508, of window schema, and of window edges currently running in ESPE 1500. The host name of ESP device 1304, the engine name of ESPE 1500, and the port number opened by ESPE 1500 are provided as an input to the query and a list of strings may be returned with the names to the projects 1502, continuous queries 1504, windows 1506, 1508, window schema, and/or window edges.

In an operation 1902, subscription services are initialized.

In an operation 1904, the initialized subscription services are started, which may create a subscribing client on behalf of event subscribing application 1822 at event subscribing device 1800. The subscribing client performs the various pub/sub activities for event subscribing application 1822. For example, a URL to ESPE 1500 may be passed to a "Start" function. The "Start" function may validate and retain the connection parameters for a specific subscribing client connection and return a pointer to the subscribing client. For illustration, the URL may be formatted as "dfESP://<host>:<port>/<project name>/<continuous query name>/<window name>".

In an operation 1906, a connection may be made between event subscribing application 1822 executing at event subscribing device 1800 and ESPE 1500 through the created subscribing client. To make the connection, the pointer to the created subscribing client may be passed to a "Connect" function and a mostly non-busy wait loop created to wait for receipt of event block objects.

In an operation 1908, an event block object is received by event subscribing application 1822 executing at event subscribing device 1800.

In an operation 1910, the received event block object is processed based on the operational functionality provided by event subscribing application 1822. For example, event subscribing application 1822 may extract data from the received event block object and store the extracted data in a database. In addition, or in the alternative, event subscribing application 1822 may extract data from the received event block object and send the extracted data to a system control operator display system, an automatic control system, a notification device, an analytic device, etc. In addition, or in the alternative, event subscribing application 1822 may extract data from the received event block object and send the extracted data to a post-incident analysis device to further analyze the data. Event subscribing application 1822 may perform any number of different types of actions as a result of extracting data from the received event block object. The action may involve presenting information on a third display 1816 or a third printer 1820, presenting information using a third speaker 1818, storing data in third computer-readable medium 1808, sending information to another device using third communication interface 1806, etc. A user may further interact with presented information using a third mouse 1814 and/or a third keyboard 1812.

In an operation 1912, a determination is made concerning whether or not processing is stopped. If processing is not stopped, processing continues in operation 1908 to continue receiving and processing event block objects. If processing is stopped, processing continues in an operation 1914.

In operation 1914, the connection made between event subscribing application 1822 and ESPE 1500 through the subscribing client is disconnected, and the subscribing client is stopped.

Histograms are used in many industries to summarize streaming data because the distribution of the data is tracked without storing all of the data points. For example, industrial system monitoring may use histograms to summarize streaming data from sensors mounted to industrial equipment. When compared to prior algorithms, histogram update application 122 significantly improves the time complexity with respect to the number of bins of a histogram. Histogram update application 122 uses two data structures, distance data 126 and bin data 128, to make insertion of a new data point have a time complexity of $O(N_P \log N_{BN})$ as compared to $O(N_P N_{BN} \log N_{BN})$ or $O(N_P N_{BN})$ for prior algorithms, where $N_P$ is a number of data points inserted. Even when the frequency of the bins is faded to forget old data, the time complexity of the quantile calculation is $O(N_{BN})$. Merging two bins using distance data 126 and bin data 128 has a time complexity of $O(\log N_{BN})$ as compared to $O(N_{BN})$ for prior algorithms. Computing a quantile estimate using distance data 126 and bin data 128 has a time complexity of $O(N_{BN})$ as compared to $O(N_{BN}^2)$ for prior algorithms. Thus, histogram update application 122 improves existing technologies for monitoring system performance.

The word "illustrative" is used herein to mean serving as an example, instance, or illustration. Any aspect or design described herein as "illustrative" is not necessarily to be construed as preferred or advantageous over other aspects or designs. Further, for the purposes of this disclosure and unless otherwise specified, "a" or "an" means "one or more". Still further, using "and" or "or" in the detailed description is intended to include "and/or" unless specifically indicated otherwise.

The foregoing description of illustrative embodiments of the disclosed subject matter has been presented for purposes of illustration and of description. It is not intended to be exhaustive or to limit the disclosed subject matter to the precise form disclosed, and modifications and variations are possible in light of the above teachings or may be acquired from practice of the disclosed subject matter. The embodiments were chosen and described in order to explain the principles of the disclosed subject matter and as practical applications of the disclosed subject matter to enable one skilled in the art to utilize the disclosed subject matter in various embodiments and with various modifications as suited to the particular use contemplated.

What is claimed is:

1. A non-transitory computer-readable medium having stored thereon computer-readable instructions that when executed by a computing device cause the computing device to:

receive a data point value of a variable;

create a new bin node by allocating first computer-readable memory to hold a bin value $k_{bn}$, a frequency value $f_{bn}$, and a distance node pointer $DN_{pn}$;

define a new bin node pointer $P_{bn}$ that points to the created new bin node;

define the bin value $k_{bn}$ as the received data point value;

add the defined, new bin node pointer $P_{bn}$ to a bin data structure in increasing sorted order based on the defined bin value $k_{bn}$ and a bin value $k_b$ of a plurality of bin nodes, wherein the bin data structure includes the plurality of bin nodes each of which hold a bin value $k_b$, a frequency value $f_b$, and a distance node pointer $DN_p$, wherein the bin data structure describes a histogram;

compute the frequency value $f_{bn}$ that indicates a number of occurrences of the defined bin value $k_{bn}$ in the bin data structure;

determine a previous bin node pointer $P_{bn\text{-}previous}$ and a next bin node pointer $P_{bn\text{-}next}$ relative to the defined, new bin node pointer $P_{bn}$;

create a first new distance node by allocating second computer-readable memory to hold a first new distance value $d_{n-1}$, a first left node pointer $LN_{pn-1}$, and a first right node pointer $RN_{pn-1}$;

define a first new distance node pointer $P_{d\text{-}1new}$ that points to the created first new distance node;

create a second new distance node by allocating third computer-readable memory to hold a second new distance value $d_{n-2}$, a second left node pointer $LN_{pn-2}$, and a second right node pointer $RN_{pn-2}$;

define a second new distance node pointer $P_{d\text{-}2new}$ that points to the created second new distance node;

define the distance node pointer $DN_{pn}$ as the defined, first new distance node pointer $P_{d\text{-}1new}$;

define a distance node pointer $DN_{pn\text{-}previous}$ of the previous bin node pointer $P_{bn\text{-}previous}$ as the defined, second new distance node pointer $P_{d\text{-}2new}$;

compute the first new distance value $d_{n-1} = k_{b\text{-}next} - k_{bn}$, wherein $k_{b\text{-}next}$ is a bin value of the next bin node pointer $P_{bn\text{-}next}$;

compute the second new distance value $d_{n-2} = k_{bn} - k_{b\text{-}previous}$; wherein $k_{b\text{-}previous}$ is a bin value of the previous bin node pointer $P_{bn\text{-}previous}$;

define the first left node pointer $LN_{pn-1}$ as the defined, new bin node pointer $P_{bn}$;

define the first right node pointer $RN_{pn-1}$ as the next bin node pointer $P_{bn\text{-}next}$;

define the second left node pointer $LN_{pn-2}$ as the previous bin node pointer $P_{bn\text{-}previous}$;

define the second right node pointer $RN_{pn-2}$ as the defined, new bin node pointer $P_{bn}$;

add the defined, first new distance node pointer $P_{d\text{-}1new}$ to a distance data structure in increasing sorted order based on the computed, first new distance value $d_{n-1}$ and a distance value d of a plurality of distance nodes, wherein the distance data structure includes the plurality of distance nodes each of which hold the distance value d, a left node pointer $LN_p$, and a right node pointer $RN_p$;

add the defined, second new distance node pointer $P_{d\text{-}2new}$ to the distance data structure in increasing sorted order based on the computed, second new distance value $d_{n-2}$ and the distance value d of the plurality of distance nodes; and output the bin value $k_b$ and the frequency value $f_b$ of each bin node of the plurality of bin nodes.

2. The non-transitory computer-readable medium of claim 1, wherein before outputting the frequency value $f_b$, the computer-readable instructions further cause the computing device to update the frequency value $f_b$ of each bin node using $f_b = f_b * \alpha^{(T_c - T_{lu})}$, where $\alpha$ is a predefined fading factor value, $T_c$ is a current time, and $T_{lu}$ is a last update time for a respective bin node.

3. The non-transitory computer-readable medium of claim 1, wherein the computer-readable instructions further cause the computing device to:

determine whether or not a number of bins of the plurality of bin nodes exceeds a predefined maximum number of bins;

when the determined number of bins exceeds the predefined maximum number of bins, select a first distance node pointer $P_{d\text{-}first}$ from the distance data structure, wherein the first distance node pointer $P_{d\text{-}first}$ has a smallest distance value in the distance data structure; and merge the left node pointer $LN_{pm}$ and the right node pointer $RN_{pm}$ of the selected, first distance node pointer $P_{d\text{-}first}$ into a second new bin node.

4. The non-transitory computer-readable medium of claim 3, wherein before merging the left node pointer $LN_p$ and the right node pointer $RN_p$, the computer-readable instructions further cause the computing device to update the frequency value $f_b$ of the left node pointer $LN_p$ using $f_b = f_b * \alpha^{(T_c - T_{lul})}$, where $\alpha$ is a predefined fading factor value, $T_c$ is a current time, and $T_{lul}$ is a last update time for the left node pointer $LN_p$.

5. The non-transitory computer-readable medium of claim 4, wherein before merging the left node pointer $LN_p$ and the right node pointer $RN_p$, the computer-readable instructions further cause the computing device to update the frequency value $f_b$ of the right node pointer $RN_p$ using $f_b = f_b * \alpha^{(T_c - T_{lur})}$, where $T_{lur}$ is a last update time for the right node pointer $RN_p$.

6. The non-transitory computer-readable medium of claim 3, wherein the first distance node pointer $P_{d\text{-}first}$ is a first distance node stored in the distance data structure.

7. The non-transitory computer-readable medium of claim 3, wherein merging the left node pointer $LN_p$ and the right node pointer $RN_p$ comprises computer-readable instructions that cause the computing device to:

create the second new bin node by allocating fourth computer-readable memory to hold a second new bin value $k_{bn-2}$, a second new frequency value $f_{bn-2}$, and a second new distance node pointer $DN_{pn-2}$;

define a merged bin node pointer $P_{bn\text{-}mrg}$ that points to the created second new bin node;

compute the second new bin value $k_{bn-2}$ using $k_{bn-2} = (k_{b1}*f_{b1} + k_{b2}*f_{b2})/(f_{b1}+f_{b2})$, where $k_{b1}$ is a bin value of the left node pointer $LN_{pm}$, $f_{b1}$ is a frequency value of the left node pointer $LN_{pm}$, $k_{b2}$ is a bin value of the right node pointer $RN_{pm}$, and $f_{b2}$ is a frequency value of the right node pointer $RN_{pm}$, wherein the left node pointer $LN_{pm}$ is a pointer to a first bin node to be merged, and the right node pointer $RN_{pm}$ is a pointer to a second bin node to be merged, wherein the first bin node and the second bin node are adjacent bin nodes of the bin data structure that have a minimum distance $d_m = k_{b2} - k_{b1}$ compared to other adjacent bin nodes of the bin data structure;

compute the second new frequency value $f_{bn-2}$ using $f_{bn-2} = f_{b1} + f_{b2}$;

add the defined, merged bin node pointer $P_{bn\text{-}mrg}$ to the bin data structure in increasing sorted order based on the computed, second new bin value $k_{bn-2}$ and the bin value $k_b$ of the plurality of bin nodes; and update the distance data structure to include the defined, merged bin node pointer $P_{bn\text{-}mrg}$.

8. The non-transitory computer-readable medium of claim 7, wherein updating the distance data structure comprises computer-readable instructions that cause the computing device to:

determine a second previous bin node pointer $P_{bmrg\text{-}previous}$ and a second next bin node pointer $P_{bmrg\text{-}next}$ relative to the defined, merged bin node pointer $P_{bn\text{-}mrg}$;

create a third new distance node by allocating fifth computer-readable memory to hold a third new distance value $d_{n-3}$, a third left node pointer $LN_{pn-3}$, and a third right node pointer $RN_{pn-3}$;

define a third new distance node pointer $P_{d\text{-}3new}$ that points to the created third new distance node;

create a fourth new distance node by allocating sixth computer-readable memory to hold a fourth new distance value $d_{n-4}$, a fourth left node pointer $LN_{pn-4}$, and a fourth right node pointer $RN_{pn-4}$;

define a fourth new distance node pointer $P_{d\text{-}4new}$ that points to the created fourth new distance node;

define the second new distance node pointer $DN_{pn-2}$ as the defined, third new distance node pointer $P_{d\text{-}3new}$;

define a distance node pointer $DN_{pmrg\text{-}previous}$ of the second previous bin node pointer $P_{bmrg\text{-}previous}$ as the defined, fourth new distance node pointer $P_{d\text{-}4new}$;

compute the third new distance value $d_{n-3} = k_{bm\text{-}next} - k_{bn-2}$, wherein $k_{bm\text{-}next}$ is a bin value of the second next bin node pointer $P_{bmrg\text{-}next}$;

compute the fourth new distance value $d_{n-4} = k_{bn-2} - k_{bm\text{-}previous}$, wherein $k_{bm\text{-}previous}$ is a bin value of the second previous bin node pointer $P_{bmrg\text{-}previous}$;

define the third left node pointer $LN_{pn-3}$ as the defined, merged bin node pointer $P_{bn\text{-}mrg}$;

define the third right node pointer $RN_{pn-3}$ as the second next bin node pointer $P_{bmrg\text{-}next}$;

define the fourth left node pointer $LN_{pn-4}$ as the second previous bin node pointer $P_{bmrg\text{-}previous}$;

define the fourth right node pointer $RN_{pn-4}$ as defined, merged bin node pointer $P_{bn\text{-}mrg}$;

add the defined, third new distance node pointer $P_{d\text{-}3new}$ to the distance data structure in increasing sorted order based on the computed, third new distance value $d_{n-3}$ and the distance value d of the plurality of distance nodes; and add the defined, fourth new distance node pointer $P_{d\text{-}4new}$ to the distance data structure in increasing sorted order based on the computed, fourth new distance value $d_{n-4}$ and the distance value d of the plurality of distance nodes.

9. The non-transitory computer-readable medium of claim 8, wherein the computer-readable instructions further cause the computing device to:

remove a first distance node associated with a distance node pointer $DN_p$ of the left node pointer $LN_{pm}$ from the distance data structure;

remove a second distance node associated with a distance node pointer $DN_p$ of the right node pointer $RN_{pm}$ from the distance data structure;

remove a first bin node associated with the left node pointer $LN_{pm}$ from the bin data structure; and remove a second bin node associated with the right node pointer $RN_{pm}$ from the bin data structure.

10. The non-transitory computer-readable medium of claim 9, wherein removing the first bin node comprises freeing a computer-readable memory allocated to hold the bin value $k_b$, the frequency value $f_b$, and the distance node pointer $DN_p$ of the left node pointer $LN_{pm}$.

11. The non-transitory computer-readable medium of claim 9, wherein removing the first distance node comprises freeing a computer-readable memory allocated to hold the distance value d, the left node pointer $LN_p$, and the right node pointer $RN_p$ of the distance node pointer $DN_p$ of the left node pointer $LN_{pm}$.

12. The non-transitory computer-readable medium of claim 1, wherein the bin value $k_b$ and the frequency value $f_b$ of each bin node of the plurality of bin nodes is output to an event stream.

13. The non-transitory computer-readable medium of claim 1, wherein the bin value $k_b$ and the frequency value $f_b$ of each bin node of the plurality of bin nodes is output to a display configured to present the histogram using the bin value $k_b$ and the frequency value $f_b$ of each bin node of the plurality of bin nodes.

14. The non-transitory computer-readable medium of claim 1, wherein the computer-readable instructions further cause the computing device to:
compute a quantile sum value array sum[$N_i$], wherein the quantile sum value array sum [$N_i$] has a number of entries $N_i$ equal to a number of bins of the plurality of bin nodes, wherein each quantile sum value array entry sum[i] is computed based on a sum of the frequency value $f_b$ of each prior bin node of the plurality of bin nodes and half the frequency value $f_b$ of a current bin node of the plurality of bin nodes;
compute a quantile sum value $s_q$ based on a predefined quantile to compute and a total sum of the frequency value $f_b$ of each bin node of the plurality of bin nodes;
identify a lower bin node associated with i and an upper bin node associated with i+1 for which sum[i]≤$s_q$ and $s_q$<sum[i+1];
compute parameter values to solve a quadratic equation;
compute a solution to the quadratic equation;
compute a quantile value for the predefined quantile to compute; and
output the computed quantile value.

15. The non-transitory computer-readable medium of claim 14, wherein the parameter values are computed using a=($f_{bn}$−$f_{bc}$), where $f_{bn}$ is the frequency value $f_b$ of a bin node pointer $P_{bn}$ associated with the identified upper bin node, and $f_{bc}$ is the frequency value $f_b$ of a bin node pointer $P_{bn}$ associated with the identified lower bin node, b=2*$f_{bc}$, and c=−2*($s_q$−sum[i]).

16. The non-transitory computer-readable medium of claim 15, wherein the solution to the quadratic equation is computed using $$z = \left(-b + \sqrt{b^2 - 4ac}\right)/2a.$$

17. The non-transitory computer-readable medium of claim 16, wherein the quantile value is computed using $q_v$=$k_{bc}$+($k_{bn}$−$k_{bc}$)*z, where $k_{bn}$ is the bin value $k_b$ of the bin node pointer $P_{bn}$ associated with the identified upper bin node, and $k_{bc}$ is the bin value $k_b$ of the bin node pointer $P_{bn}$ associated with the identified lower bin node.

18. The non-transitory computer-readable medium of claim 1, wherein the data point value is received in an event stream.

19. A method of responding to new data, the method comprising:
receiving a data point value of a variable;
creating, by a computing device, a new bin node by allocating first computer-readable memory to hold a bin value $k_{bn}$, a frequency value $f_{bn}$, and a distance node pointer $DN_{pn}$;
defining, by the computing device, a new bin node pointer $P_{bn}$ that points to the created new bin node;
defining, by the computing device, the bin value $k_{bn}$ as the received data point value;
adding, by the computing device, the defined, new bin node pointer $P_{bn}$ to a bin data structure in increasing sorted order based on the defined bin value $k_{bn}$ and a bin value $k_b$ of a plurality of bin nodes, wherein the bin data structure includes the plurality of bin nodes each of which hold a bin value $k_b$, a frequency value $f_b$, and a distance node pointer $DN_p$, wherein the bin data structure describes a histogram;
computing, by the computing device, the frequency value $f_{bn}$ that indicates a number of occurrences of the defined bin value $k_{bn}$ in the bin data structure;
determining, by the computing device, a previous bin node pointer $P_{bn\text{-}previous}$ and a next bin node pointer $P_{bn\text{-}next}$ relative to the defined, new bin node pointer $P_{bn}$;
creating, by the computing device, a first new distance node by allocating second computer-readable memory to hold a first new distance value $d_{n-1}$, a first left node pointer $LN_{pn-1}$, and a first right node pointer $RN_{pn-1}$;
defining, by the computing device, a first new distance node pointer $P_{d\text{-}1new}$ that points to the created first new distance node;
creating, by the computing device, a second new distance node by allocating third computer-readable memory to hold a second new distance value $d_{n-2}$, a second left node pointer $LN_{pn-2}$, and a second right node pointer $RN_{pn-2}$;
defining, by the computing device, a second new distance node pointer $P_{d\text{-}2new}$ that points to the created second new distance node;
defining, by the computing device, the distance node pointer $DN_{pn}$ as the defined, first new distance node pointer $P_{d\text{-}1new}$;
defining, by the computing device, a distance node pointer $DN_{pn\text{-}previous}$ of the previous bin node pointer $P_{bn\text{-}previous}$ as the defined, second new distance node pointer $P_{d\text{-}2new}$;
computing, by the computing device, the first new distance value $d_{n-1}$=$k_{b\text{-}next}$−$k_{bn}$, wherein $k_{b\text{-}next}$ is a bin value of the next bin node pointer $P_{bn\text{-}next}$;
computing, by the computing device, the second new distance value $d_{n-2}$=$k_{bn}$−$k_{b\text{-}previous}$, wherein $k_{b\text{-}previous}$ is a bin value of the previous bin node pointer $P_{bn\text{-}previous}$;
defining, by the computing device, the first left node pointer $LN_{pn-1}$ as the defined, new bin node pointer $P_{bn}$;
defining, by the computing device, the first right node pointer $RN_{pn-1}$ as the next bin node pointer $P_{bn\text{-}next}$;
defining, by the computing device, the second left node pointer $LN_{pn-2}$ as the previous bin node pointer $P_{bn\text{-}previous}$;
defining, by the computing device, the second right node pointer $RN_{pn-2}$ as the defined, new bin node pointer $P_{bn}$;
adding, by the computing device, the defined, first new distance node pointer $P_{d\text{-}1new}$ to a distance data structure in increasing sorted order based on the computed, first new distance value $d_{n-1}$ and a distance value d of a plurality of distance nodes, wherein the distance data structure includes the plurality of distance nodes each of which hold the distance value d, a left node pointer $LN_p$, and a right node pointer $RN_p$;
adding, by the computing device, the defined, second new distance node pointer $P_{d\text{-}2new}$ to the distance data structure in increasing sorted order based on the computed, second new distance value $d_{n-2}$ and the distance value d of the plurality of distance nodes; and outputting, by the computing device, the bin value $k_b$ and the frequency value $f_b$ of each bin node of the plurality of bin nodes.

20. The method of claim 19, further comprising, before outputting the frequency value $f_b$, updating, by the computing device, the frequency value $f_b$ of each bin node using $f_b = * \alpha^{(T_c - T_{lu})}$, where $\alpha$ is a predefined fading factor value, $T_c$ is a current time, and $T_{lu}$ is a last update time for a respective bin node.

21. The method of claim 19, further comprising:
determining, by the computing device, whether or not a number of bins of the plurality of bin nodes exceeds a predefined maximum number of bins;
when the determined number of bins exceeds the predefined maximum number of bins,
  selecting, by the computing device, a first distance node pointer $P_{d-first}$ from the distance data structure, wherein the first distance node pointer $P_{d-first}$ has a smallest distance value in the distance data structure; and
  merging, by the computing device, the left node pointer $LN_{pm}$ and the right node pointer $RN_{pm}$ of the selected, first distance node pointer $P_{d-first}$ into a second new bin node.

22. The method of claim 21, further comprising, before merging the left node pointer $LN_p$ and the right node pointer $RN_p$, updating, by the computing device, the frequency value $f_b$ of the left node pointer $LN_p$ using $f_b = f_b * \alpha^{(T_c - T_{lul})}$, where $\alpha$ is a predefined fading factor value, $T_c$ is a current time, and $T_{lul}$ is a last update time for the left node pointer $LN_p$.

23. The method of claim 22, further comprising, before merging the left node pointer $LN_p$ and the right node pointer $RN_p$, updating, by the computing device, the frequency value $f_b$ of the right node pointer $RN_p$ using $f_b = f_b * \alpha^{(T_c - T_{lul})}$, where $T_{lur}$ is a last update time for the right node pointer $RN_p$.

24. The method of claim 22, wherein the first distance node pointer $P_{d-first}$ is a first distance node stored in the distance data structure.

25. The method of claim 22, wherein merging the left node pointer $LN_p$ and the right node pointer $RN_p$ comprises:
creating, by the computing device, the second new bin node by allocating fourth computer-readable memory to hold a second new bin value $k_{bn-2}$, a second new frequency value $f_{bn-2}$, and a second new distance node pointer $DN_{pn-2}$;
defining, by the computing device, a merged bin node pointer $P_{bn-mrg}$ that points to the created second new bin node;
computing, by the computing device, the second new bin value $k_{bn-2}$ using $k_{bn-2} = (k_{b1}*f_{b1} + k_{b2}*f_{b2})/(f_{b1} + f_{b2})$, where $k_{b1}$ is a bin value of the left node pointer $LN_{pm}$, $f_{b1}$ is a frequency value of the left node pointer $LN_{pm}$, $k_{b2}$ is a bin value of the right node pointer $RN_{pm}$, and $f_{b2}$ is a frequency value of the right node pointer $RN_{pm}$, wherein the left node pointer $LN_{pm}$ is a pointer to a first bin node to be merged, and the right node pointer $RN_{pm}$ is a pointer to a second bin node to be merged, wherein the first bin node and the second bin node are adjacent bin nodes of the bin data structure that have a minimum distance $d_m = k_{b2} - k_{b1}$ compared to other adjacent bin nodes of the bin data structure;

computing, by the computing device, the second new frequency value $f_{bn-2}$ using $f_{bn-2} = f_{b1} + f_{b2}$;
adding, by the computing device, the defined, merged bin node pointer $P_{bn-mrg}$ to the bin data structure in increasing sorted order based on the computed, second new bin value $k_{bn-2}$ and the bin value $k_b$ of the plurality of bin nodes; and
updating, by the computing device, the distance data structure to include the defined, merged bin node pointer $P_{bn-mrg}$.

26. The method of claim 25, wherein updating the distance data structure comprises:
determining, by the computing device, a second previous bin node pointer $P_{bmrg-previous}$ and a second next bin node pointer $P_{bmrg-next}$ relative to the defined, merged bin node pointer $P_{bn-mrg}$;
creating, by the computing device, a third new distance node by allocating fifth computer-readable memory to hold a third new distance value $d_{n-3}$, a third left node pointer $LN_{pn-3}$, and a third right node pointer $RN_{pn-3}$;
defining, by the computing device, a third new distance node pointer $P_{d-3new}$ that points to the created third new distance node;
creating, by the computing device, a fourth new distance node by allocating sixth computer-readable memory to hold a fourth new distance value $d_{n-4}$, a fourth left node pointer $LN_{pn-4}$, and a fourth right node pointer $RN_{pn-4}$;
defining, by the computing device, a fourth new distance node pointer $P_{d-4new}$ that points to the created fourth new distance node;
defining, by the computing device, the second new distance node pointer $DN_{pn-2}$ as the defined, third new distance node pointer $P_{d-3new}$;
defining, by the computing device, a distance node pointer $DN_{pmrg-previous}$ of the second previous bin node pointer $P_{bmrg-previous}$ as the defined, fourth new distance node pointer $P_{d-4new}$;
computing, by the computing device, the third new distance value $d_{n-3} = k_{bm-next} - k_{bn-2}$, wherein $k_{bm-next}$ is a bin value of the second next bin node pointer $P_{bmrg-next}$;
computing, by the computing device, the fourth new distance value $d_{n-4} = k_{bn-2} - k_{bm-previous}$, wherein $k_{bm-previous}$ is a bin value of the second previous bin node pointer $P_{bmrg-previous}$;
defining, by the computing device, the third left node pointer $LN_{pn-3}$ as the defined, merged bin node pointer $P_{bn-mrg}$;
defining, by the computing device, the third right node pointer $RN_{pn-3}$ as the second next bin node pointer $P_{bmrg-next}$;
defining, by the computing device, the fourth left node pointer $LN_{pn-4}$ as the second previous bin node pointer $P_{bmrg-previous}$;
defining, by the computing device, the fourth right node pointer $RN_{pn-4}$ as defined, merged bin node pointer $P_{bn-mrg}$;
adding, by the computing device, the defined, third new distance node pointer $P_{d-3new}$ to the distance data structure in increasing sorted order based on the computed, third new distance value $d_{n-3}$ and the distance value d of the plurality of distance nodes; and
adding, by the computing device, the defined, fourth new distance node pointer $P_{d-4new}$ to the distance data structure in increasing sorted order based on the computed, fourth new distance value $d_{n-4}$ and the distance value d of the plurality of distance nodes.

27. The method of claim 26, further comprising:
- removing, by the computing device, a first distance node associated with a distance node pointer $DN_p$ of the left node pointer $LN_{pm}$ from the distance data structure;
- removing, by the computing device, a second distance node associated with a distance node pointer $DN_p$ of the right node pointer $RN_{pm}$ from the distance data structure;
- removing, by the computing device, a first bin node associated with the left node pointer $LN_{pm}$ from the bin data structure; and
- removing, by the computing device, a second bin node associated with the right node pointer $RN_{pm}$ from the bin data structure.

28. The method of claim 27, wherein removing the first bin node comprises freeing a computer-readable memory allocated to hold the bin value $k_b$, the frequency value $f_b$, and the distance node pointer $DN_p$ of the left node pointer $LN_{pm}$.

29. The method of claim 27, wherein removing the first distance node comprises freeing a computer-readable memory allocated to hold the distance value d, the left node pointer $LN_p$, and the right node pointer $RN_p$ of the distance node pointer $DN_p$ of the left node pointer $LN_{pm}$.

30. A computing device comprising:
- a processor; and
- a non-transitory computer-readable medium operably coupled to the processor, the computer-readable medium having computer-readable instructions stored thereon that, when executed by the processor, cause the computing device to
  - receive a data point value of a variable;
  - create a new bin node by allocating first computer-readable memory to hold a bin value $k_{bn}$, a frequency value $f_{bn}$, and a distance node pointer $DN_{pn}$;
  - define a new bin node pointer $P_{bn}$ that points to the created new bin node;
  - define the bin value $k_{bn}$ as the received data point value;
  - add the defined, new bin node pointer $P_{bn}$ to a bin data structure in increasing sorted order based on the defined bin value $k_{bn}$ and a bin value $k_b$ of a plurality of bin nodes, wherein the bin data structure includes the plurality of bin nodes each of which hold a bin value $k_b$, a frequency value $f_b$, and a distance node pointer $DN_p$, wherein the bin data structure describes a histogram;
  - compute the frequency value $f_{bn}$ that indicates a number of occurrences of the defined bin value $k_{bn}$ in the bin data structure;
  - determine a previous bin node pointer $P_{bn\text{-}previous}$ and a next bin node pointer $P_{bn\text{-}next}$ relative to the defined, new bin node pointer $P_{bn}$;
  - create a first new distance node by allocating second computer-readable memory to hold a first new distance value $d_{n-1}$, a first left node pointer $LN_{pn-1}$, and a first right node pointer $RN_{pn-1}$;
  - define a first new distance node pointer $P_{d\text{-}1new}$ that points to the created first new distance node;
  - create a second new distance node by allocating third computer-readable memory to hold a second new distance value $d_{n-2}$, a second left node pointer $LN_{pn-2}$, and a second right node pointer $RN_{pn-2}$;
  - define a second new distance node pointer $P_{d\text{-}2new}$ that points to the created second new distance node;
  - define the distance node pointer $DN_{pn}$ as the defined, first new distance node pointer $P_{d\text{-}1new}$;
  - define a distance node pointer $DN_{pn\text{-}previous}$ of the previous bin node pointer $P_{bn\text{-}previous}$ as the defined, second new distance node pointer $P_{d\text{-}2new}$;
  - compute the first new distance value $d_{n-1}k=k_{b\text{-}next}-k_{bn}$, wherein $k_{b\text{-}next}$ is a bin value of the next bin node pointer $P_{bn\text{-}next}$;
  - compute the second new distance value $d_{n-2}=k_{bn}-k_{b\text{-}previous}$, wherein $k_{b\text{-}previous}$ is a bin value of the previous bin node pointer $P_{bn\text{-}previous}$;
  - define the first left node pointer $LN_{pn-1}$ as the defined, new bin node pointer $P_{bn}$;
  - define the first right node pointer $RN_{pn-1}$ as the next bin node pointer $P_{bn\text{-}next}$;
  - define the second left node pointer $LN_{pn-2}$ as the previous bin node pointer $P_{bn\text{-}previous}$;
  - define the second right node pointer $RN_{pn-2}$ as the defined, new bin node pointer $P_{bn}$;
  - add the defined, first new distance node pointer $P_{d\text{-}1new}$ to a distance data structure in increasing sorted order based on the computed, first new distance value $d_{n-1}$ and a distance value d of a plurality of distance nodes, wherein the distance data structure includes the plurality of distance nodes each of which hold the distance value d, a left node pointer $LN_p$, and a right node pointer $RN_p$;
  - add the defined, second new distance node pointer $P_{d\text{-}2new}$ to the distance data structure in increasing sorted order based on the computed, second new distance value $d_{n-2}$ and the distance value d of the plurality of distance nodes; and
  - output the bin value $k_b$ and the frequency value $f_b$ of each bin node of the plurality of bin nodes.

* * * * *

UNITED STATES PATENT AND TRADEMARK OFFICE
CERTIFICATE OF CORRECTION

PATENT NO. : 10,157,213 B1  
APPLICATION NO. : 15/813989  
DATED : December 18, 2018  
INVENTOR(S) : Markel Sanz Ausin et al.

Page 1 of 1

It is certified that error appears in the above-identified patent and that said Letters Patent is hereby corrected as shown below:

In the Specification

Column 14, Line 59:
Delete the phrase "the sum values is" and replace with --the sum value $s$ is--.

Column 15, Line 9:
Delete the phrase "whether or not $sum[i] < s_q$" and replace with --whether or not $sum[i] \leq s_q$--.

Column 15, Line 21:
Delete the phrase "where $\alpha = (f_{bn} - f_{bc})$," and replace with --where $a = (f_{bn} - f_{bc})$,--.

Column 15, Line 30:
Delete the phrase "quantile value q, is" and replace with --quantile value $q_v$ is--.

Column 15, Line 33:
Delete the phrase "quantile value q, is" and replace with --quantile value $q_v$ is--.

Column 25, Line 29:
Delete the phrase "compared to $O(N_{BN}{}^2)$" and replace with --compared to $O(N_{BN}^2)$--.

In the Claims

Claim 23, Column 31, Line 39:
Delete the phrase "$f_b = f_b * \alpha^{(T_c - T_{lul})}$," and replace with --$f_b = f_b * \alpha^{(T_c - T_{lur})}$,--.

Claim 30, Column 34, Line 20:
Delete the phrase "$d_{n-1}k = k_{b\text{-}next} - k_{bn}$," and replace with --$d_{n-1} = k_{b\text{-}next} - k_{bn}$,--.

Signed and Sealed this  
Twelfth Day of March, 2019

Andrei Iancu  
*Director of the United States Patent and Trademark Office*